United States Patent
Trundle et al.

(10) Patent No.: US 8,350,697 B2
(45) Date of Patent: Jan. 8, 2013

(54) REMOTE DEVICE CONTROL AND ENERGY MONITORING BY ANALYZING DATA AND APPLYING RULES

(75) Inventors: Stephen Scott Trundle, Falls Church, VA (US); Alison Jane Slavin, Vienna, VA (US); Jean-Paul Martin, Oakton, VA (US); David James Hutz, Herndon, VA (US)

(73) Assignee: Alarm.com Incorporated, Vienna, VA (US)

( * ) Notice: Subject to any disclaimer, the term of this patent is extended or adjusted under 35 U.S.C. 154(b) by 423 days.

(21) Appl. No.: 12/782,626

(22) Filed: May 18, 2010

(65) Prior Publication Data
US 2010/0289643 A1    Nov. 18, 2010

Related U.S. Application Data

(60) Provisional application No. 61/179,224, filed on May 18, 2009.

(51) Int. Cl.
*G08B 21/00* (2006.01)
(52) U.S. Cl. ............... 340/539.3; 340/539.26; 700/275; 700/291

(58) Field of Classification Search .............. 340/539.1, 340/539.22, 539.26–539.28, 539.3; 700/19, 700/20, 275–278, 291
See application file for complete search history.

(56) References Cited

U.S. PATENT DOCUMENTS

| | | | |
|---|---|---|---|
| 6,216,956 | B1 | 4/2001 | Ehlers et al. |
| 7,253,732 | B2 | 8/2007 | Osann |
| 7,274,975 | B2 | 9/2007 | Miller |
| 2005/0125083 | A1 | 6/2005 | Kiko |

OTHER PUBLICATIONS

International Search Report and Written Opinion issued in Application No. PCT/US2010/035322, mailed Jul. 20, 2010, 11 pages.

*Primary Examiner* — Jeffery Hofsass
(74) *Attorney, Agent, or Firm* — Fish & Richardson P.C.

(57) ABSTRACT

Techniques are described for providing remote device (e.g., thermostat, lighting, appliance, etc.) control and/or energy monitoring. A system monitors sensor data captured by one or more sensors that sense attributes relevant to user presence at one or more monitored properties and status of one or more energy consuming devices associated with the one or more monitored properties. The system analyzes the monitored sensor data and the monitored device status with respect to a set of one or more rules and performs an operation related to controlling the one or more energy consuming devices based on the analysis of the monitored sensor data and the monitored device status with respect to the set of one or more rules.

20 Claims, 24 Drawing Sheets

| | Presence Area #1 | Presence Area #2 | Window | Door | Weather | User | Temp | Energy Measure | Geographic Location | Action |
|---|---|---|---|---|---|---|---|---|---|---|
| 411 | No | No | Any | Any | Any | Any | Any | Any | Any | Turn off all lights; set all thermostats to conserve |
| 412 | No | Yes | Any | Any | Any | Any | Any | Any | Any | Turn off lights in Area #1; set thermostat for Area #1 to conserve |
| 413 | Yes | No | Any | Any | Any | Any | Any | Any | Any | Turn off lights in Area #2; set thermostat for Area #2 to conserve |
| 414 | Any | Any | Open | Any | Any | Any | Any | Any | Any | Send alert when thermostat is set to cooling or heating mode |
| 415 | Any | Any | Any | Open | Any | Any | Any | Any | Any | Stop thermostat from cooling or heating while door is open |
| 416 | Any | Any | Any | Any | Any | Any | > 85° | Any | Any | Control thermostat to cool mode |
| 417 | Any | Any | Any | Any | Any | Any | < 45° | Any | Any | Control thermostat to heat mode |
| 418 | No | No | Any | Any | Any | Any | Any | Any | < 1 Mile | Suggest light and appliance control |
| 419 | No | No | Any | Any | Any | Any | Any | Any | < 5 Miles | Control thermostat to scheduled heating or cooling mode |
| 420 | No | No | Any | Any | Any | Any | Any | Any | > 5 Miles | Control thermostat to conserve |
| 421 | Yes | No | Any | Any | Any | User1 | Any | Any | Any | Set User1 control for Area #1 |
| 422 | Yes | No | Any | Any | Any | User2 | Any | Any | Any | Set User2 control for Area #1 |
| 423 | Yes | Yes | Any | Any | 50 to 80° | Any | Any | Low | Any | Control thermostat and lighting to scheduled mode |
| 424 | Yes | Yes | Any | Any | 50 to 80° | Any | Any | High | Any | Control thermostat and lighting to conserve |
| 425 | Any | Any | Open | Open | Rain | Any | Any | Any | Any | Send alert to close window/door due to anticipated weather |
| 426 | Yes | Yes | Closed | Closed | > 90° | Pet | Off | High | > 20 Miles | Send alert to set thermostat to cool mode for pet |

Lights     510

The table below shows all compatible light devices included in your system. Use the controls below to turn individual lights on or off.

- 512 — ALL LIGHTS  ✗  ✓
- 514 — Lights Dimmer  ✗  ✓  (95%)
- 516 — Kitchen Dimmer  ✗  ✓  (22%)
- 518 — Coffee Maker  ✗  ✓

520 — [ Set ]

Scheduled Automation     530

| Device | Days Of Week | On Time | Off Time | Delete All |
|---|---|---|---|---|
| Light Dimmer | Every Day | 10:00 PM | 7:00 AM | Edit I Delete |

➕ Create New Schedule

Event-Triggered Automation     540

| Trigger | Device | Duration | Event | Delete All |
|---|---|---|---|---|
| Work Door | Light Dimmer | 2 Minutes | When Sensor Closes | Edit I Delete |

➕ Create New Automation

FIG. 5

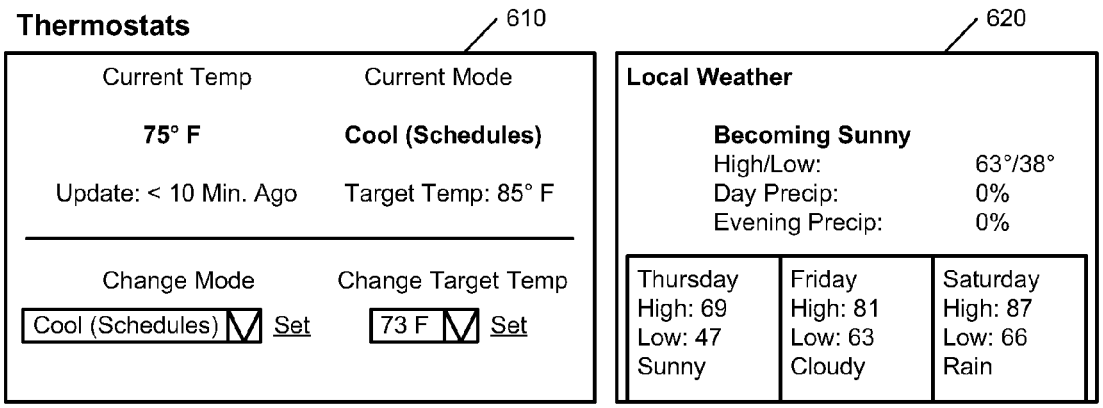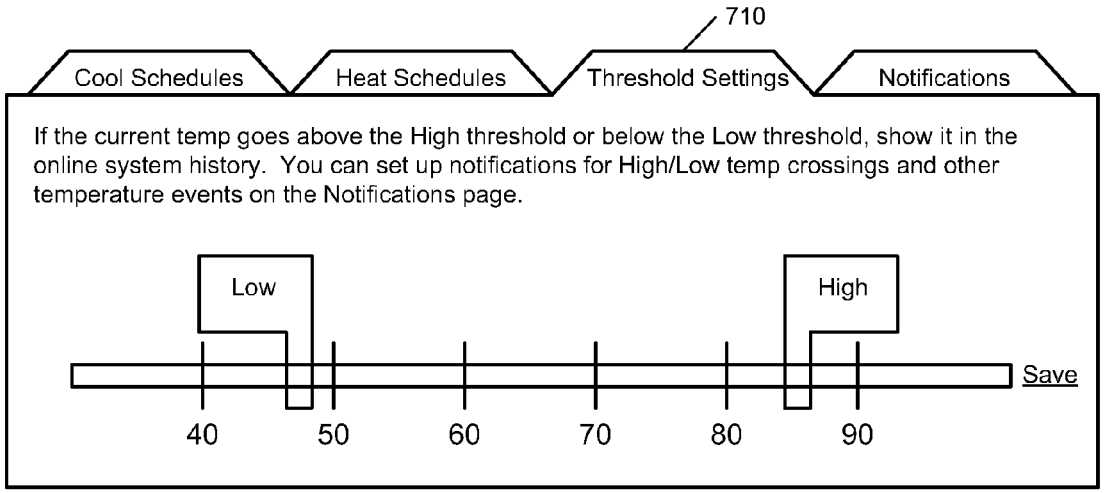
FIG. 7

REMOTE DEVICE CONTROL AND ENERGY MONITORING BY ANALYZING DATA AND APPLYING RULES

CROSS REFERENCE TO RELATED APPLICATIONS

The present application claims the benefit of U.S. Provisional Application No. 61/179,224, filed May 18, 2009, which is incorporated herein by reference in its entirety for all purposes.

TECHNICAL FIELD

This disclosure relates to remote device control and energy monitoring technology.

BACKGROUND

Many people equip homes and businesses with alarm systems to provide increased security for their homes and businesses. Alarm systems may include control panels that a person may use to control operation of the alarm system and sensors that monitor for security breaches. In response to an alarm system detecting a security breach, the alarm system may generate an audible alert and, if the alarm system is monitored by a monitoring service, the alarm system may send electronic data to the monitoring service to alert the monitoring service of the security breach.

SUMMARY

Techniques are described for remote device control and energy monitoring.

In one aspect, a method is described for performing an operation related to controlling one or more energy consuming devices. The method includes monitoring sensor data captured by one or more sensors that sense attributes relevant to user presence at one or more monitored properties and monitoring status of one or more energy consuming devices associated with the one or more monitored properties. The method also includes analyzing the monitored sensor data and the monitored device status with respect to a set of one or more rules and performing, using at least one processor, an operation related to controlling the one or more energy consuming devices based on the analysis of the monitored sensor data and the monitored device status with respect to the set of one or more rules.

Implementations may include one or more of the following features. For example, the method may include automatically, without human intervention, controlling the one or more energy consuming devices based on the analysis of the monitored sensor data and the monitored device status with respect to the set of one or more rules. In another example, the method may include sending, to a user associated with the one or more monitored properties, an alert with a suggestion for controlling the one or more energy consuming devices based on the analysis of the monitored sensor data and the monitored device status with respect to the set of one or more rules.

In some implementations, the method may include determining whether a property is occupied based on at least one of a door sensor that senses whether a door at the property is oriented in an open position or a closed position, a motion sensor that senses motion within the property, and an image sensor that captures images of the property, and monitoring a temperature setting of a thermostat that controls a heating and cooling system for the property. In these implementations, the method may include comparing the determination of whether the property is occupied and the temperature setting of the thermostat with the set of one or more rules and performing an operation related to changing the temperature setting of the thermostat based on the comparison.

In some examples, the method may include determining whether an area of a property corresponding to a lighting device is occupied based on at least one of a door sensor that senses whether a door at the area of the property is oriented in an open position or a closed position, a motion sensor that senses motion within the area of the property, and an image sensor that captures images of the area of the property and monitoring an operating state of the lighting device that provides lighting for the area of the property. In these examples, the method may include comparing the determination of whether the area of the property is occupied and the operating state of the lighting device with the set of one or more rules and performing an operation related to changing the operating state of the lighting device based on the comparison.

In addition, the method may include monitoring, over time for a property, sensor data captured by one or more sensors that sense attributes at the property. The monitored sensor data may include at least one of door sensor data captured by a door sensor that senses whether a door at the property is oriented in an open position or a closed position, motion sensor data captured by a motion sensor that senses motion within the property, image sensor data captured by an image sensor that captures images of the property, and security system arming data captured by a security panel that enables a user to arm or disarm a security system that monitors the property. The method may include determining a presence pattern for the property based on the monitoring of the sensor data over time for the property, analyzing the determined presence pattern for the property and the monitored device status with respect to the set of one or more rules, and performing an operation related to controlling one or more energy consuming devices associated with the property based on the analysis of the determined presence pattern for the property and the monitored device status with respect to the set of one or more rules. Further, the method may include automatically, without human intervention, controlling the one or more energy consuming devices associated with the property to conserve energy when the determined presence pattern for the property indicates that the property is not occupied.

In some implementations, the method may include accessing weather data and analyzing the accessed weather data in conjunction with the monitored sensor data and the monitored status of one or more energy consuming devices with respect to the set of one or more rules. In these implementations, the method may include determining an operation related to controlling the one or more energy consuming devices that accounts for the accessed weather data based on the analysis of the accessed weather data in conjunction with the monitored sensor data and the monitored status of one or more energy consuming devices, and performing the determined operation related to controlling the one or more energy consuming devices that accounts for the accessed weather data.

In some examples, the method may include monitoring geographic location data of one or more users associated with the one or more monitored properties and inferring future occupancy status of the one or more users in the one or more monitored properties based on the monitored geographic location data. In these examples, the method may include determining an operation related to controlling the one or more energy consuming devices in the one or more monitored properties based on the inferred future occupancy status of the one or more users in the one or more monitored properties, and performing the determined operation related to controlling the one or more energy consuming devices.

Further, the method may include determining a distance of a user from a property based on the monitored geographic location data, comparing the distance of the user from the property to a threshold distance from the property, and determining whether the user is within the threshold distance from the property based on the comparison. The method also may include inferring that the user will occupy the property within a particular period of time based on a determination that the user is within the threshold distance from the property and inferring that the user will not occupy the property within the particular period of time based on a determination that the user is outside of the threshold distance from the property. The method further may include performing an operation related to preparing the property for occupation by the particular period of time based on an inference that the user will occupy the property within the particular period of time, and performing an operation related to conserving energy during the particular period of time based on an inference that the user will not occupy the property within the particular period of time.

In some implementations, the method may include determining a direction in which the user is traveling based on the monitored geographic location data and determining whether the user is traveling toward the property or away from the property based on the determined direction in which the user is traveling. In these implementations, the method may include inferring that the user will occupy the property within a particular period of time based on a determination that the user is traveling toward the property and inferring that the user will not occupy the property within the particular period of time based on a determination that the user is traveling away from the property. Also, in these implementations, the method may include performing an operation related to preparing the property for occupation by the particular period of time based on an inference that the user will occupy the property within the particular period of time and performing an operation related to conserving energy during the particular period of time based on an inference that the user will not occupy the property within the particular period of time.

In some examples, the method may include detecting an event that triggers an operation related to controlling the one or more energy consuming devices based on the monitored sensor data and determining a user identity for one or more users associated with the detected event. In these examples, the method may include determining a user-specific operation related to controlling the one or more energy consuming devices based on the detected event and the determined user identity for the one or more users and performing the user-specific operation related to controlling the one or more energy consuming devices.

In addition, the method may include determining a first user identity of a first user associated with the detected event and determining a second user identity of a second user associated with the detected event. The second user identity may be different than the first user identity. The method also may include accessing, from electronic storage, a first device control profile defined for the determined first user identity and accessing, from electronic storage, a second device control profile defined for the determined second user identity. The first device control profile may be different than the second device control profile. The method further may include accessing, from electronic storage, one or more permission rules that indicate which device control profile controls when multiple user identities are determined to be associated with the detected event, determining an operation related to controlling the one or more energy consuming devices based on the accessed first device control profile, the accessed second device control profile, and the accessed one or more permission rules, and performing the operation related to controlling the one or more energy consuming devices determined based on the accessed first device control profile, the accessed second device control profile, and the accessed one or more permission rules.

Further, the method may include monitoring sensor data captured by sensors that sense attributes relevant to user presence at multiple, different locations and aggregating the monitored sensor data from the multiple, different locations. The method also may include analyzing the aggregated sensor data from the multiple, different locations with respect to the set of one or more rules and performing an operation related to controlling the one or more energy consuming devices associated with one of the multiple, different locations based on the analysis of the aggregated sensor data.

In some implementations, the method may include monitoring first sensor data captured by first local sensors that sense attributes relevant to user presence at a first property and monitoring second sensor data captured by second local sensors that sense attributes relevant to user presence at a second property. The second property may be separate and remote from the first property. In these implementations, the method may include performing an operation related to controlling one or more energy consuming devices associated with the second property based on the first sensor data captured by the first local sensors that sense attributes relevant to user presence at the first property.

In addition, the method may include defining an energy management profile for the one or more monitored properties and monitoring energy usage for the one or more energy consuming devices associated with the one or more monitored properties. The method also may include analyzing the monitored energy usage, the monitored sensor data, and the monitored device status with respect to the energy management profile and performing an operation related to managing energy consumption for the one or more monitored properties based on the analysis of the monitored energy usage, the monitored sensor data, and the monitored device status with respect to the energy management profile.

In some examples, the method may include defining, as part of the energy management profile, one or more rules that indicate instances in which it is acceptable to modify energy usage of the one or more energy consuming devices in accordance with utility rate data and analyzing the monitored energy usage, the monitored sensor data, and the monitored device status with respect to the one or more rules that indicate instances in which it is acceptable to modify energy usage of the one or more energy consuming devices in accordance with utility rate data. In these examples, the method may include, when the analysis of the monitored energy usage, the monitored sensor data, and the monitored device status with respect to the one or more rules reveals that it is acceptable to modify energy usage of the one or more energy consuming devices in accordance with utility rate data, accessing utility rate data that includes data specifying low-rate time periods when energy consumption rates are at a relatively low level, medium-rate time periods when energy consumption rates are at a relatively medium level, and high-rate time periods when energy consumption rates are at a relatively high level and controlling the one or more energy consuming devices to reduce energy consumption expense based on the accessed utility rate data.

The method may include defining, as part of the energy management profile, one or more thresholds that define circumstances in which energy conservation operations are permitted and circumstances in which energy conservation operations are forbidden and analyzing the monitored energy usage, the monitored sensor data, and the monitored device status with respect to the one or more thresholds. The method also may include controlling the one or more energy consuming devices to conserve energy when the analysis of the monitored energy usage, the monitored sensor data, and the monitored device status with respect to the one or more thresholds reveals that energy conservation operations are permitted. The method further may include controlling the one or more energy consuming devices without regard for energy conservation when the analysis of the monitored energy usage, the monitored sensor data, and the monitored device status with respect to the one or more thresholds reveals that energy conservation operations are forbidden.

In some implementations, the method may include monitoring energy consumption data for multiple, different monitored properties, monitoring sensor data for the multiple, different monitored properties, and monitoring device status for energy consuming devices associated with the multiple, different monitored properties. In these implementations, the method may include identifying an efficient energy user based on the monitored energy consumption data, the monitored sensor data, and the monitored device status, determining an energy usage profile for the efficient energy user based on the monitored energy consumption data, the monitored sensor data, and the monitored device status, and providing an energy usage suggestion to another user that is different than the efficient energy user based on the determined energy usage profile for the efficient energy user.

In some examples, the method may include identifying an energy usage level of a monitored property based on the monitored energy consumption data and identifying an activity level of the monitored property based on the monitored sensor data and the monitored device status. The activity level of the monitored property may represent how frequently the monitored property is determined to be occupied based on the monitored sensor data and how frequently energy consuming devices are detected as being in use in the monitored property based on the monitored device status. In these examples, the method may include determining a ratio of the identified energy usage level of the monitored property and the identified activity level of the monitored property and identifying a user of the monitored property as the efficient energy user based on the determined ratio. Further, in these examples, the method may include identifying another monitored property that has an activity level that is similar to the identified activity level of the monitored property and that has an energy usage level that is higher than the identified energy usage level of the monitored property and providing the energy usage suggestion to a user of the other monitored property.

Implementations of the described techniques may include hardware, a method or process implemented at least partially in hardware, or a computer-readable storage medium encoded with executable instructions that, when executed by a processor, perform operations.

The details of one or more implementations are set forth in the accompanying drawings and the description below. Other features will be apparent from the description and drawings, and from the claims.

DESCRIPTION OF DRAWINGS

FIG. 4 illustrates example rules.

FIGS. 5-8 illustrate example interfaces.

DETAILED DESCRIPTION

Techniques are described for providing remote device (e.g., thermostat, lighting, appliance, etc.) control and/or energy monitoring. The techniques may combine energy conservation efforts with user convenience and may provide remote device control and/or energy monitoring that conserves energy while providing an enhanced level of convenience to users.

In some implementations, a native mobile device application enables use of a mobile device to monitor and control thermostat, lighting, and other energy-consuming appliances in a home, business, vacation or other property from anywhere. The native mobile device application provides alerts related to energy consumption and events that may impact user decision on energy consumption. The native mobile device application also tracks the mobile device's physical location and uses location tracking to automatically set thermostat, lights, and appliances accordingly.

Figure 1A:
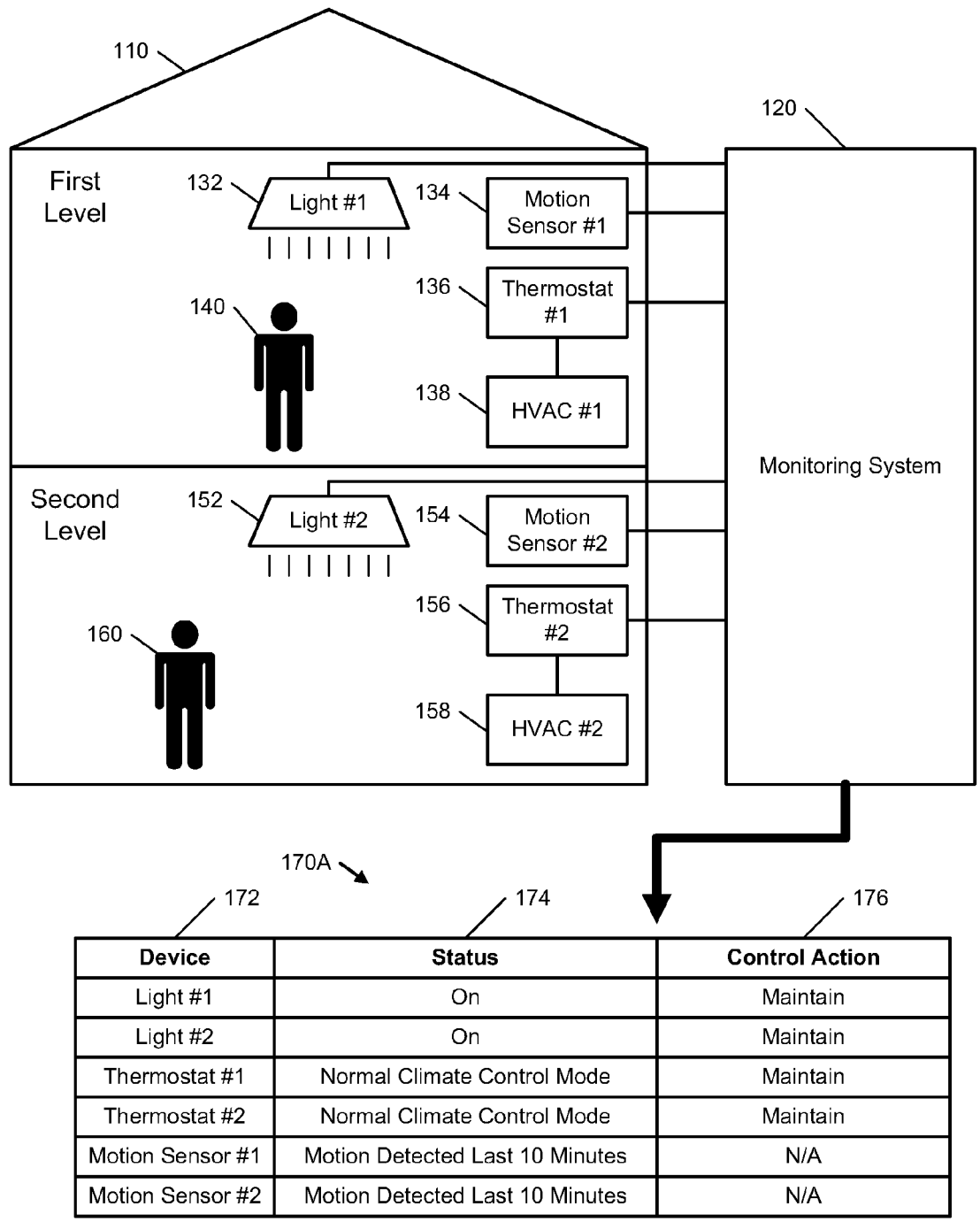
FIGS. 1A and 1B illustrate an example of controlling devices based on monitored sensor data and device status.
Figure 1B:
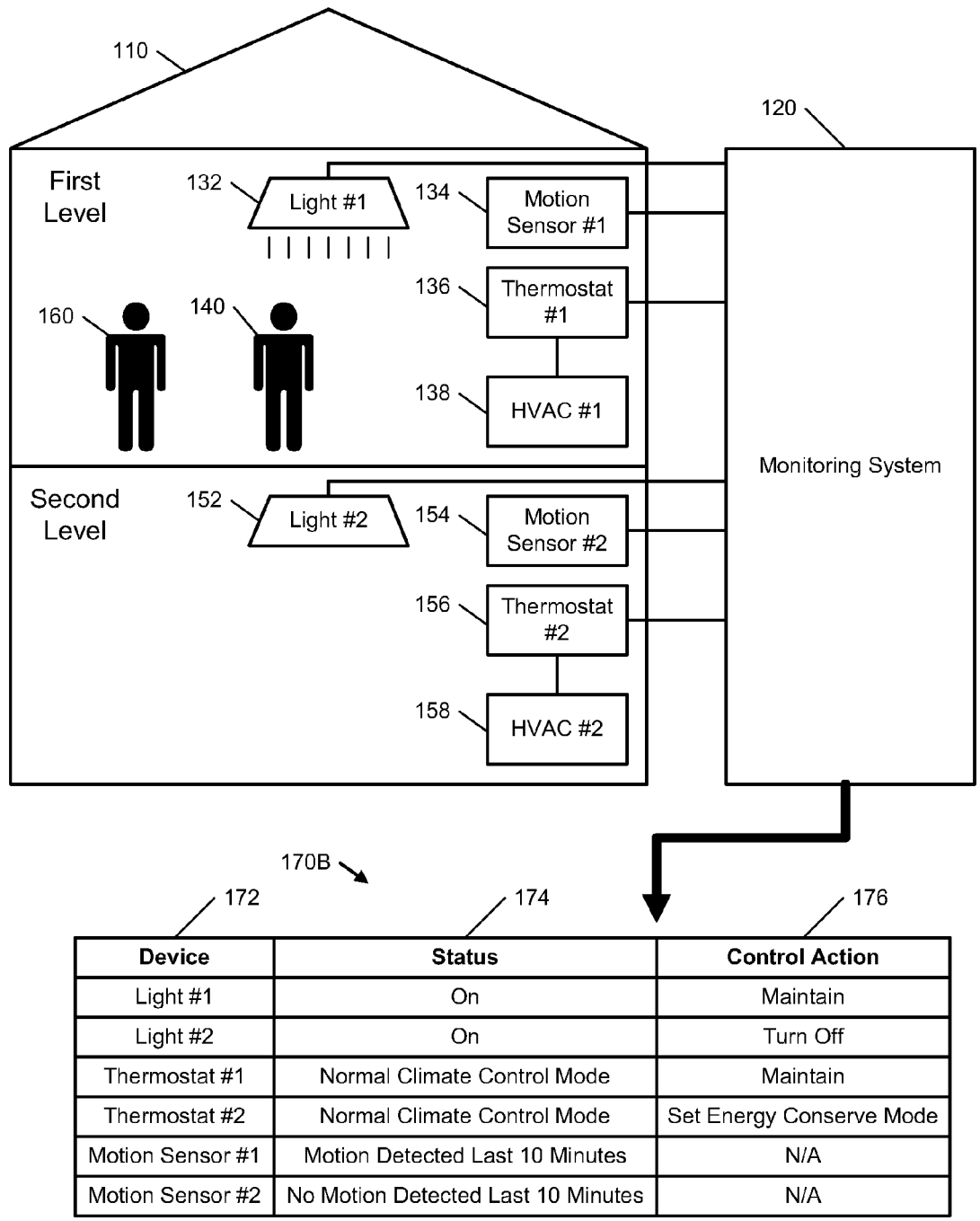

FIGS. 1A and 1B illustrate an example of monitoring sensor data and device status, and controlling devices based on the monitored sensor data and device status. As shown, a property 110 is monitored by a monitoring system 120. The property 110 may be a residence, an office building, or any other type of property that is capable of being monitored by the monitoring system 120. The monitoring system 120 may be a local monitoring system (e.g., a local security system for the property 110) that is located at the property and monitors physical events and device status at the property 110 through one or more sensors. The monitoring system 120 also may be remote from the property 110 and receive, over a network, sensor data from one or more sensors located at the property 110. The monitoring system 120 further may include both local components that are located at the property 110 and remote components that are located separate from the property 110 at another property.

In the example shown in FIGS. 1A and 1B, the property 110 includes two levels. The first level has a first lighting device 132, a first motion sensor 134, a first thermostat 136, and a first heating and cooling system 138. The monitoring system 120 monitors the state (e.g., on, off, dimmer setting) of the first lighting device 132 and controls (e.g., turns on or off) the first lighting device 132. The monitoring system 120 also receives motion sensor data for the first level from the first motion sensor 134. The monitoring system 120 further monitors the state (e.g., the mode set, current temperature measured, etc.) of the first thermostat 136 and controls the first thermostat 136. The first thermostat 136 measures a temperature associated with the first level and the controls the first heating and cooling system 138 based on the measured temperature and a temperature control setting of the first thermostat 136. The monitoring system 120 monitors and controls the first lighting device 132 and the first thermostat 136 using a controller, such as a zwave controller.

Similar to the first level, the second level has a second lighting device 152, a second motion sensor 154, a second thermostat 156, and a second heating and cooling system 158. The monitoring system 120 monitors the state (e.g., on, off, dimmer setting) of the second lighting device 152 and controls (e.g., turns on or off) the second lighting device 152. The monitoring system 120 also receives motion sensor data for the second level from the second motion sensor 154. The monitoring system 120 further monitors the state (e.g., the mode set, current temperature measured, etc.) of the second thermostat 156 and controls the second thermostat 156. The second thermostat 156 measures a temperature associated with the second level and controls the second heating and cooling system 158 based on the measured temperature and a temperature control setting of the second thermostat 156. The monitoring system 120 monitors and controls the second lighting device 152 and the second thermostat 156 using a controller, such as a zwave controller.

In the example shown in FIG. 1A, the monitoring system 120 sets device status and control data 170A based on a state of the lighting devices/thermostats and the activity in the property 110 sensed by the motion sensors. The device status and control data 170A includes a device column 172, a status column 174, and a control action column 176. As shown in FIG. 1A, the monitoring system 120 detects that the first lighting device 132 is turned on, the second lighting device 152 is turned on, the first thermostat 136 is set at a normal climate control mode, and the second thermostat 156 is set at a normal climate control mode. In addition, the monitoring system 120 detects that the first motion sensor 134 detected motion within the last ten minutes (e.g., based on the presence of user 140 on the first level) and the second motion sensor 154 detected motion within the last ten minutes (e.g., based on the presence of user 160 on the second level). Because the monitoring system 120 detected activity that indicates presence of a user on each of the first and second levels of the property 110, the monitoring system 120 determines to control lighting devices and thermostats in a manner that is suitable for user presence on each of the first and second levels of the property 110. In this regard, the monitoring system 120 determines to maintain the first lighting device 132 turned on, maintain the second lighting device 152 turned on, maintain the first thermostat 136 set at the normal climate control mode, and maintain the second thermostat 156 set at the normal climate control mode.

In the example shown in FIG. 1B, the user 160 has moved from the second level and joined the user 140 on the first level of the property 110. After the user 160 has moved to the first level, the monitoring system 120 sets new device status and control data 170B based on a state of the lighting devices/thermostats and the activity in the property 110 sensed by the motion sensors. The device status and control data 170B includes a device column 172, a status column 174, and a control action column 176. As shown in FIG. 1B, the monitoring system 120 detects that the first lighting device 132 is turned on, the second lighting device 152 is turned on, the first thermostat 136 is set at the normal climate control mode, and the second thermostat 156 is set at the normal climate control mode. In addition, the monitoring system 120 detects that the first motion sensor 134 detected motion within the last ten minutes (e.g., based on the presence of users 140 and 160 on the first level) and the second motion sensor 154 has not detected motion within the last ten minutes. Because the monitoring system 120 detected activity that indicates presence of a user on the first level, but not the second level of the property 110, the monitoring system 120 determines to control lighting devices and thermostats in a manner that is suitable for user presence on the first level, but conserves energy on the second level of the property 110. In this regard, the monitoring system 120 determines to maintain the first lighting device 132 turned on, turn the second lighting device 152 off, maintain the first thermostat 136 set at the normal climate control mode, and set the second thermostat 156 to an energy conserve mode. Because the monitoring system 120 monitors the state of devices within the property 110 and the activity of users within the property 110, the monitoring system 120 is able to automatically control devices within the property 110 to provide enhanced energy conservation and property automation.

Figure 2:
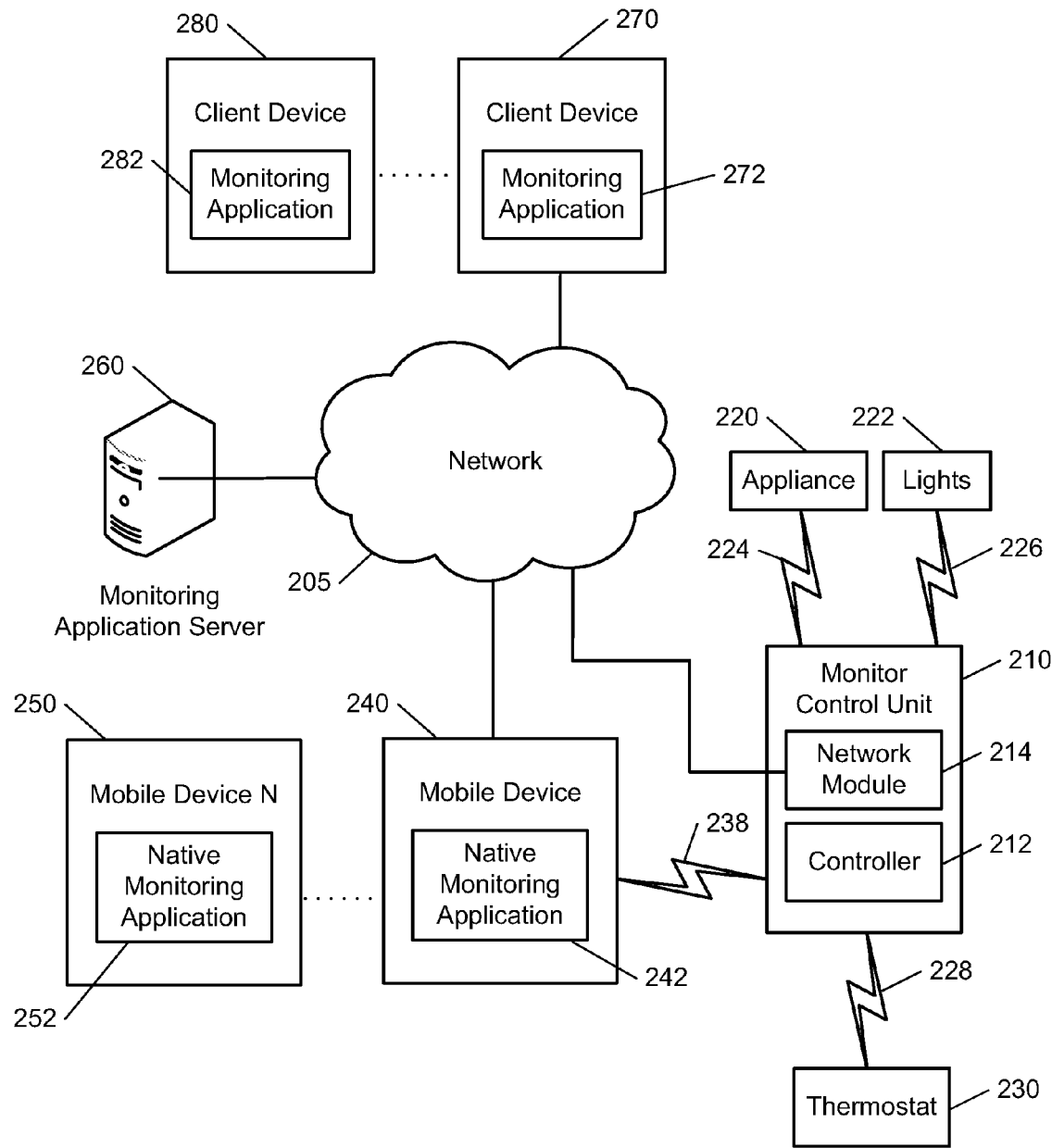
FIG. 2 is a block diagram of an example system.

FIG. 2 illustrates an example of an electronic system 200 configured to provide remote thermostat control/energy monitoring using devices. The electronic system 200 includes a network 205, a monitoring system control unit 210, one or more mobile devices 240, 250, a monitoring application server 260, and one or more client devices 270, 280. In some examples, the network 205 facilitates communications between the monitoring system control unit 210, the one or more mobile devices 240, 250, the one or more client devices 270, 280, and the monitoring application server 260.

The network 205 is configured to enable exchange of electronic communications between devices connected to the network 205. For example, the network 205 may be configured to enable exchange of electronic communications between the monitoring system control unit 210, the one or more mobile devices 240, 250, the one or more client devices 270, 280, and the monitoring application server 260. The network 205 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 205 may include multiple networks or subnetworks, each of which may include, for example, a wired or wireless data pathway. The network 205 may include a circuit-switched network, a packet-switched data network, or any other network able to carry electronic communications (e.g., data or voice communications). For example, the network 205 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 205 may include one or more networks that include wireless data channels and wireless voice channels. The network 205 may be a wireless network, a broadband network, or a combination of networks including a wireless network and a broadband network.

The monitoring system control unit 210 includes a controller 212 and a network module 214. The controller 212 is configured to control a monitoring system (e.g., a home alarm or security system) that includes the monitoring system control unit 210. In some examples, the controller 212 may include a processor or other control circuitry configured to execute instructions of a program that controls operation of an alarm system. In these examples, the controller 212 may be configured to receive input from sensors, detectors, or other devices included in the alarm system and control operations of devices included in the alarm system or other household devices (e.g., a thermostat, an appliance, lights, etc.). For example, the controller 212 may be configured to control operation of the network module 214 included in the monitoring system control unit 210.

The network module 214 is a communication device configured to exchange communications over the network 205. The network module 214 may be a wireless communication module configured to exchange wireless communications over the network 205. For example, the network module 214 may be a wireless communication device configured to exchange communications over a wireless data channel and a wireless voice channel. In this example, the network module 214 may transmit alarm data over a wireless data channel and establish a two-way voice communication session over a wireless voice channel. The wireless communication device may include one or more of a GSM module, a radio modem, cellular transmission module, or any type of module configured to exchange communications in one of the following formats: GSM or GPRS, CDMA, EDGE or EGPRS, EV-DO or EVDO, UMTS, or IP.

The network module 214 also may be a wired communication module configured to exchange communications over the network 205 using a wired connection. For instance, the network module 214 may be a modem, a network interface card, or another type of network interface device. The network module 214 may be an Ethernet network card configured to enable the monitoring system control unit 210 to communicate over a local area network and/or the Internet. The network module 214 also may be a voiceband modem configured to enable the alarm panel to communicate over the telephone lines of Plain Old Telephone Systems (POTS).

The monitoring system that includes the monitoring system control unit 210 includes one or more sensors or detectors. For example, the monitoring system may include multiple sensors. The sensors may include a contact sensor, a motion sensor, a glass break sensor, or any other type of sensor included in an alarm system or security system. The sensors also may include an environmental sensor, such as a temperature sensor, a water sensor, a rain sensor, a wind sensor, a light sensor, a smoke detector, a carbon monoxide detector, an air quality sensor, etc. The sensors further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors may include a radio-frequency identification (RFID) sensor that identifies a particular article that includes a pre-assigned RFID tag. In addition, the sensors may include a video/photographic camera or other type of optical sensing device configured to capture images and may include an energy consumption sensor for appliances and devices in a property monitored by the monitoring system.

The monitoring system control unit 210 communicates with modules 220, 222, and 230 to perform thermostat control and energy monitoring. The module 220 is connected to one or more appliances, is configured to monitor energy consumption of the one or more appliances, and is configured to control operation of the one or more appliances. The module 220 may directly measure energy consumption of the one or more appliances or may estimate energy consumption of the one or more appliances based on detected usage of the one or more appliances. The module 220 may communicate energy monitoring information to the monitoring system control unit 210 and may control the one or more appliances based on commands received from the monitoring system control unit 210.

The module 222 is connected to one or more lighting systems, is configured to monitor energy consumption of the one or more lighting systems, and is configured to control operation of the one or more lighting systems. The module 222 may directly measure energy consumption of the one or more lighting systems or may estimate energy consumption of the one or more lighting systems based on detected usage of the one or more lighting systems. The module 222 may communicate energy monitoring information to the monitoring system control unit 210 and may control the one or more lighting systems based on commands received from the monitoring system control unit 210.

The module 230 is connected to a thermostat, is configured to monitor temperature and/or energy consumption of a temperature regulation system associated with the thermostat, and is configured to control operation of the thermostat. The module 230 may directly measure energy consumption of the temperature regulation system associated with the thermostat or may estimate energy consumption of the temperature regulation system associated with the thermostat based on detected usage of the temperature regulation system associated with the thermostat. The module 230 may communicate temperature and energy monitoring information to the monitoring system control unit 210 and may control the thermostat based on commands received from the monitoring system control unit 210.

The modules 220, 222, and 230 communicate with the controller 212 over communication links 224, 226, and 228. The communication links 224, 226, and 228 may be a wired or wireless data pathway configured to transmit signals from the modules 220, 222, and 230 to the controller 212. The modules 220, 222, and 230 may continuously transmit sensed values to the controller 212, periodically transmit sensed values to the controller 212, or transmit sensed values to the controller 212 in response to a change in a sensed value.

The monitoring application server 260 is an electronic device configured to provide monitoring services by exchanging electronic communications with the monitoring system control unit 210, the one or more mobile devices 240, 250, and the one or more client devices 270, 280 over the network 205. For example, the monitoring application server 260 may be configured to monitor events generated by the monitoring system control unit 210. In this example, the monitoring application server 260 may exchange electronic communications with the network module 214 included in the monitoring system control unit 210 to receive information regarding alarm events detected by the monitoring system control unit 210. The monitoring application server 260 also may receive information regarding events from the one or more mobile devices 240, 250.

The monitoring application server 260 may store sensor (e.g., thermostat and energy consumption) data received from the monitoring system and perform analysis of sensor data received from the monitoring system. Based on the analysis, the monitoring application server 260 may communicate with and control aspects of the monitoring system control unit 210, the one or more mobile devices 240, 250, or the one or more client devices 270, 280.

The one or more mobile devices 240, 250 are devices that host and display user interfaces and that host one or more native applications (e.g., the native monitoring application 242, 252). The one or more mobile devices 240, 250 may be cellular phones or non-cellular locally networked devices with displays. The one or more mobile devices 240, 250 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The one or more mobile devices 240, 250 may be the same or may include mobile devices of different types. The one or more mobile devices 240, 250 may perform functions unrelated to the monitoring system, such as placing personal telephone calls, playing music, playing video, displaying pictures, browsing the Internet, maintaining an electronic calendar, etc.

The one or more mobile devices 240, 250 communicate with and receive monitoring system data from the monitoring system control unit 210 using the communication link 238. For instance, the one or more mobile devices 240, 250 may communicate with the monitoring system control unit 210 using various local wireless protocols such as wifi, Bluetooth, zwave, zigbee, HomePlug (ethernet over powerline), or wired protocols such as Ethernet and USB, to connect the one or more mobile devices 240, 250 to local security and automation equipment. The one or more mobile devices 240, 250 may connect locally to the monitoring system and its sensors and other devices. The local connection may improve the speed of status and control communications because communicating through the network 205 with a remote server (e.g., the monitoring application server 260) may be significantly slower.

Although the one or more mobile devices 240, 250 are shown as communicating with the monitoring system control unit 210, the one or more mobile devices 240, 250 may communicate directly with the sensors and other devices controlled by the monitoring system control unit 210. In some implementations, the one or more mobile devices 240, 250 replace the monitoring system control unit 210 and perform the functions of the monitoring system control unit 210 for local monitoring and long range/offsite communication.

In other implementations, the one or more mobile devices 240, 250 receive monitoring system data captured by the monitoring system control unit 210 through the network 205. The one or more mobile devices 240, 250 may receive the data from the monitoring system control unit 210 through the network 205 or the monitoring application server 260 may relay data received from the monitoring system control unit 210 to the one or more mobile devices 240, 250 through the network 205. In this regard, the monitoring application server 260 may facilitate communication between the one or more mobile devices 240, 250 and the monitoring system.

In some implementations, the one or more mobile devices 240, 250 may be configured to switch whether the one or more mobile devices 240, 250 communicate with the monitoring system control unit 210 directly (e.g., through link 238) or through the monitoring application server 260 (e.g., through network 205) based on a location of the one or more mobile devices 240, 250. For instance, when the one or more mobile devices 240, 250 are located close to the monitoring system control unit 210 and in range to communicate directly with the monitoring system control unit 210, the one or more mobile devices 240, 250 use direct communication. When the one or more mobile devices 240, 250 are located far from the monitoring system control unit 210 and not in range to communicate directly with the monitoring system control unit 210, the one or more mobile devices 240, 250 use communication through the monitoring application server 260.

Although the one or more mobile devices 240, 250 are shown as being connected to the network 205, in some implementations, the one or more mobile devices 240, 250 are not connected to the network 205. In these implementations, the one or more mobile devices 240, 250 communicate directly with one or more of the monitoring system components and no network (e.g., Internet) connection or reliance on remote servers is needed.

In some implementations, the one or more mobile devices 240, 250 are used in conjunction with only local sensors and/or local devices in a house. In these implementations, the system 100 only includes the one or more mobile devices 240, 250 and the modules 220, 222, and 230. The one or more mobile devices 240, 250 receive data directly from the modules 220, 222, and 230 and sends data directly to the modules 220, 222, and 230. The one or more mobile devices 240, 250 provide the appropriate interfaces/processing to provide monitoring information, generate alerts, modify settings, control the thermostat, lighting, and appliance devices, etc.

In other implementations, the system 200 further includes network 205 and the modules 220, 222, and 230 are configured to communicate sensor data to the one or more mobile devices 240, 250 over network 205 (e.g., the Internet, cellular network, etc.). In yet another implementation, the modules 220, 222, and 230 (or a component, such as a bridge/router) are intelligent enough to change the communication pathway from a direct local pathway when the one or more mobile devices 240, 250 are in close physical proximity to the modules 220, 222, and 230 to a pathway over network 205 when the one or more mobile devices 240, 250 are farther from the modules 220, 222, and 230. In some examples, the system leverages GPS information from the one or more mobile devices 240, 250 to determine whether the one or more mobile devices 240, 250 are close enough to the modules 220, 222, and 230 to use the direct local pathway or whether the one or more mobile devices 240, 250 are far enough from the modules 220, 222, and 230 that the pathway over network 205 is required. In other examples, the system leverages status communications (e.g., pinging) between the one or more mobile devices 240, 250 and the modules 220, 222, and 230 to determine whether communication using the direct local pathway is possible. If communication using the direct local pathway is possible, the one or more mobile devices 240, 250 communicate with the modules 220, 222, and 230 using the direct local pathway. If communication using the direct local pathway is not possible, the one or more mobile devices 240, 250 communicate with the modules 220, 222, and 230 using the pathway over network 205.

The one or more mobile devices 240, 250 each include a native monitoring application 242, 252, respectively. The native monitoring application 242, 252 refers to a software/firmware program running on the corresponding mobile device that enables the user interface and features describe below. The one or more mobile devices 240, 250 may load or install the native monitoring application 242, 252 based on data received over a network or data received from local media. The native monitoring application 242, 252 runs on mobile devices platforms, such as iPhone, iPod touch, Blackberry, Google Android, Windows Mobile, etc.

The native monitoring application 242, 252 monitors and controls thermostat, lighting, and other energy-consuming appliances in a home, business, vacation or other property from anywhere. The native monitoring application 242, 252 enables users to easily monitor and control how much energy they are consuming. The native monitoring application 242, 252 also enables users to set up a comfortable environment with respect to temperature, lighting, etc.

In some implementations, the native monitoring application 242, 252 enables the mobile device to connect to thermostat(s) remotely and provide a user real-time, remote control of temperature in a building. For example, a user may take the user's mobile device on a business trip out of town. While the user is out of town, the weather at the user's home becomes unexpectedly hot. The user may use native monitoring application 242, 252 to control the thermostat(s) in the user's home to turn the air conditioning system on or adjust a temperature of the home to a desired level. In this example, when the temperature becomes hot and the user has a pet that remains in the home, the user may lower the temperature of the thermostat to cool the home to increase the comfort of the pet. Alternatively, when the temperature becomes hot and no one remains in the home, the user may increase the temperature of the thermostat to save on energy costs of cooling the home unnecessarily.

In some examples, the native monitoring application 242, 252 tracks the mobile device's physical location using GPS or other location protocols built into device and uses location tracking to control thermostat, lighting, and other energy-consuming appliances. For example, the native monitoring application 242, 252 may check location of the mobile device periodically and automatically detect when user is going toward or away from a home and sets thermostat, lights, appliances accordingly. For instance, when the user is detected as moving away from the home and lights remain on in the property, the native monitoring application 242, 252 may turn off the lights. When the user is detected is moving toward the home, the native monitoring application 242, 252 may turn on lights in the home, adjust the thermostat to a comfortable setting, and turn on useful appliances when the user is less than a threshold distance from the home.

The native monitoring application 242, 252 also may alert the user during time frames when their energy utility company is charging more or less for energy, so user can take action through the native monitoring application 242, 252. For instance, the native monitoring application 242, 252 may receive information related to utility company rates from the monitoring application server 260, from another source on the Internet, or from a user entering information related to utility company rates (e.g., a user entering monthly billing statements). The native monitoring application 242, 252 may store the rate information for use in alerting the user. The native monitoring application 242, 252 may periodically update the rate information. In using rate information to alert the user, the native monitoring application 242, 252 may provide an alert to the user when lights remain on in the home and the rate information indicates that the utility company is charging relatively high rates, but determine not to provide an alert to the user when lights remain on in the home and the rate information indicates that the utility company is charging relatively low rates. In another example, the native monitoring application 242, 252 may alert the user when the native monitoring application 242, 252 detects the user starting an appliance (e.g., a dishwasher) at a time when the rate is relatively high. In this example, if the user determines not to use the appliance at the time, the native monitoring application 242, 252 may offer to provide another alert to the user when the utility company rate drops or offer to automatically start the appliance when the utility company rate drops.

In further examples, native monitoring application 242, 252 may automatically change thermostat temperature on user behalf in response to utility pricing based on user settings. For instance, the native monitoring application 242, 252 may define rules for thermostat control based on user input. The rules may account utility pricing and prior energy consumption. For example, the native monitoring application 242, 252 may define a rule to automatically increase a temperature of a thermostat two degrees when the utility company rate is relatively high and the air conditioner is being used. In this example, the native monitoring application 242, 252 may automatically decrease the temperature of the thermostat two degrees when the utility company rate falls back to a relatively low rate and the air conditioner is still being used.

The native monitoring application 242, 252 further may account for prior monthly energy consumption in automatically setting temperatures. For instance, when monthly energy consumption has been relatively high, the native monitoring application 242, 252 may automatically increase a temperature of a thermostat two degrees when the utility company rate is relatively high and the air conditioner is being used. However, when monthly energy consumption has been relatively low, the native monitoring application 242, 252 may not automatically increase the temperature of the thermostat two degrees when the utility company rate is relatively high and the air conditioner is being used. Accounting for prior monthly energy consumption may assist a user in getting more consistent energy consumption bills and, therefore, may assist the user in budgeting monthly finances more accurately.

In some implementations, native monitoring application 242, 252 uses a real-time weather feed (e.g. from national weather service) to help guide intelligent, automated decision making on thermostat temperature. The native monitoring application 242, 252 may receive weather information from the monitoring application server 260 or from another source on the Internet. The native monitoring application 242, 252 may periodically update the weather information or receive weather related alerts. The native monitoring application 242, 252 may account for the weather information in automatically controlling thermostat, lighting, and other energy-consuming appliances and providing alerts to the user. For instance, in the example discussed above in which the weather at a user's home becomes unexpectedly hot when the user is out of town, the native monitoring application 242, 252 may detect that the weather has become unexpectedly hot based on the weather feed information and alert the user.

The native monitoring application 242, 252 may include detailed and summary indoor/outdoor temperature and humidity reports to show users how they are setting temperature at various times of day. The reports could cross reference to money paid for energy at given time of day. The report data may be based on user input or automatically received or accessed from a utility company. For instance, users may manually enter their energy bill amount into the native monitoring application 242, 252 each month to get pulled into reporting, or accept a feed from the utility company.

The native monitoring application 242, 252 may monitor sunrise/sunset times and automatically turn specified lights on/off at dusk/dawn. For instance, the native monitoring application 242, 252 may receive information related to sunrise/sunset times from the monitoring application server 260 or from another source on the Internet and store the information for use in controlling lights.

The native monitoring application 242, 252 may provide user-defined schedules for controlling wake-up and turn-down schemes. For instance, at wake-up time, the native monitoring application 242, 252 may turn on a bedroom light, change a thermostat setting to a day setting, and turn on a coffee maker. At turn-down time, the native monitoring application 242, 252 may turn off a bedroom light, change a thermostat setting to a night setting, and arm an alarm system to a "Stay" mode.

The native monitoring application 242, 252 may operate in Home Mode, Away-Work Mode, Away-Vacation Mode and other user defined modes that control temperature, light, appliance behavior. The native monitoring application 242, 252 may define the modes and settings corresponding to the modes based on user input. The native monitoring application 242, 252 also may switch between the modes based on user input or may automatically switch between modes based on factors, such as location of the mobile device and status of an alarm system at one or more locations.

The native monitoring application 242, 252 may work as a local remote control device for use when on or near the premises. Alternatively, the native monitoring application 242, 252 may work as a long-range remote control that could work from anywhere in the world for long-range wireless protocols (e.g., GSM, CDMA, WiMax, etc.) via remote servers, such as the monitoring application server 260.

The native monitoring application 242, 252 also may implement a permission system that provides a different level of control for different users. For instance, parent users may have full control of the monitoring system and a child user may have limited control (e.g., the child user may be able to control lighting systems, but may not be able to control appliances). The permission system may be implemented based on user-specific passcodes or particular mobile devices may be assigned to particular users.

In implementations in which multiple mobile devices are included in the system 100, the native monitoring application 242, 252 may include rules that govern input from which of the multiple devices controls when conflicting input is received. For instance, when a parent user is attempting to perform a first action (e.g., raise temperature) and a child user is attempting to perform a second, different action that conflicts with the first action (e.g., lower temperature), the rules of the native monitoring application 242, 252 (or monitoring system in general) may perform only the first action because the parent user has higher priority than the child user.

The one or more client devices 270, 280 may be any type of client devices (e.g., personal computers) that are capable of performing operations similar to those described as being performed by the one or more mobile devices 240, 250. The one or more client devices 270, 280 operate a monitoring application 272, 282 either locally or over a network. The monitoring application 272, 282 may be similar to the native monitoring application 242, 252 operated by the one or more mobile devices 240, 250.

FIGS. 3, 9, 11, 13, 15, 17, and 19 illustrate example processes. The operations of the example processes are described generally as being performed by the system 200. The operations of the example processes may be performed by one of the components of the system 200 (e.g., the monitoring application server 260) or may be performed by any combination of the components of the system 200. In some implementations, operations of the example processes may be performed by one or more processors included in one or more electronic devices.

Figure 3:
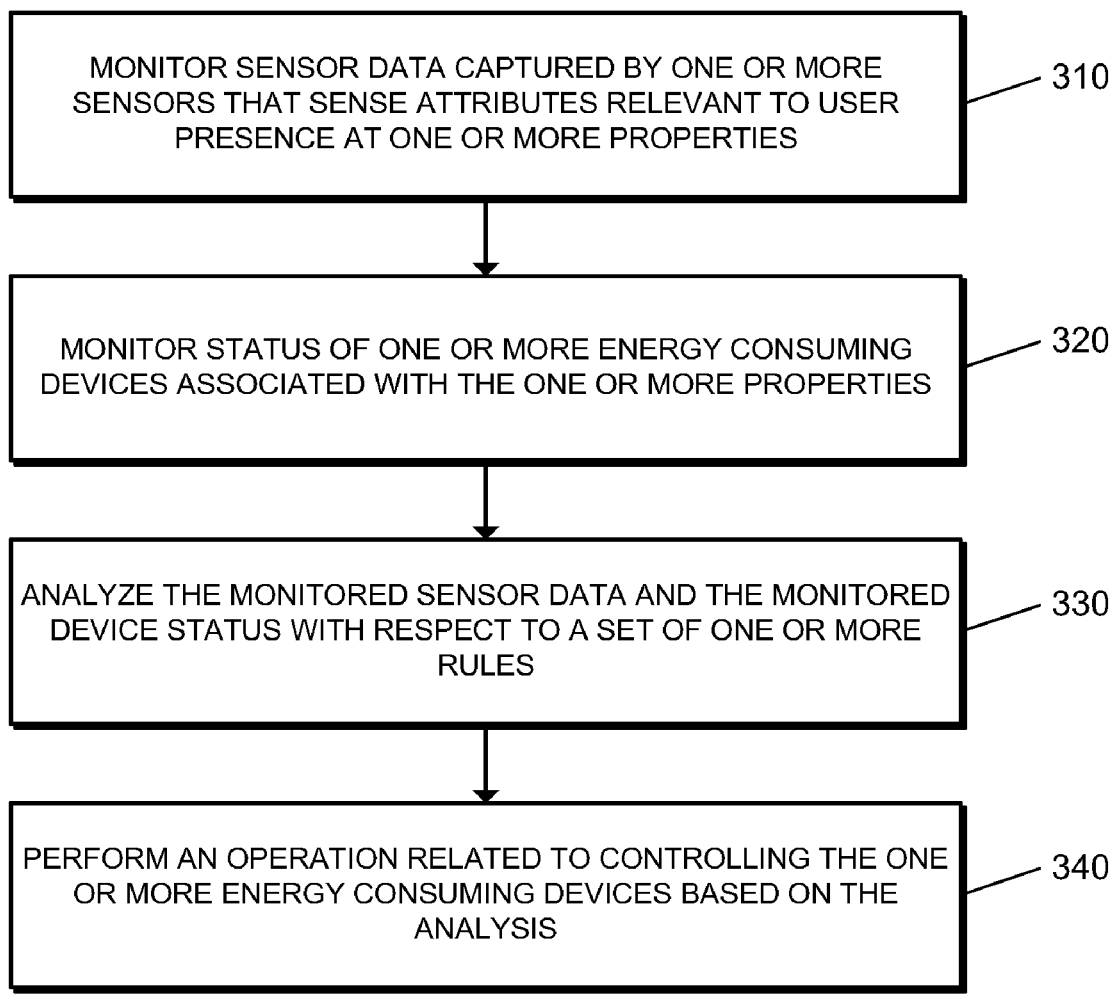
FIGS. 3, 9, 11, 13, 15, 17, and 19 are flow charts illustrating example processes.

FIG. 3 illustrates an example process 300 for performing an operation related to controlling one or more energy consuming devices based on monitored sensor data and monitored device status. The system 200 monitors sensor data captured by one or more sensors that sense attributes relevant to user presence at one or more properties (310). For example, the system 200 receives, either directly or via a network, data communications from sensors included in a monitoring system that are configured to sense physical attributes of the physical world at the one or more properties. The sensor data may include presence monitoring events, such as contact sensor data captured by door and/or window sensors, motion sensor data captured by a motion sensor, and image monitoring data captured by a camera. The sensor data also may include environmental sensor data (e.g., temperature sensor data, air quality sensor data, water sensor data, etc.), health monitoring sensor data (e.g., blood sugar monitors, blood pressure monitors, etc.), radio frequency identification (RFID) sensor data (e.g., RFID tags may be applied to articles (e.g., a car or a prescription bottle) and RFID sensors may detect presence of the articles), or any other sensor data related to physical attributes capable of being monitored using sensor technology.

The system 200 may monitor the received sensor data for single detected events (e.g., a single contact sensor trigger) or a series of detected events (e.g., a pattern of contact sensor triggers, a motion sensor trigger, and an RFID tag identification). In addition, the sensor data may be direct data captured by the sensors or may be processed prior to being received by the system 200. The sensor data may processed by performing statistical calculations on the sensor data to identify trends within the data (e.g., based on sensor data captured during typical work days, a customer leaves the home through the front door on average at 8:26 am and enters the home through the front door on average at 5:38 pm).

The system 200 monitors status of one or more energy consuming devices associated with the one or more properties (320). For example, the system 200 may receive, either directly or via a network, data communications from one or more energy consuming devices located at the one or more properties. In this example, the system 200 may receive the data communications directly from the one or more energy consuming devices or from a controller (e.g., a zwave controller) added to the one or more energy consuming devices. The system 200 may process the data communications to determine a state of a device (e.g., whether the device is turned on or off) or a control setting for the device (e.g., a target temperature or schedule for a thermostat). The system 200 also may process the data communications to determine measured energy consumption of the one or more energy consuming devices. The system 200 may track device usage patterns for the one or more energy consuming devices and track energy consumed through operation of the one or more energy consuming devices.

The system 200 analyzes the monitored sensor data and the monitored device status with respect to a set of one or more rules (330) and performs an operation related to controlling the one or more energy consuming devices based on the analysis (340). For instance, the system 200 analyzes events detected using the sensor data in relation to device status information to perform control of the one or more energy consuming devices. The system 200 may analyze single detected events and take action according to single detected events. For instance, when the system 200 determines that the last user has left a property, the system 200 may turn off the lights in the property and set the thermostat to an energy conserve mode.

The system 200 also may analyze patterns of the sensor data and device status and take action according to the relative overlap in the patterns. For instance, the system 200 may determine a presence pattern that relates to when users are typically present in a property. The system 200 also may determine a device usage pattern (e.g., a thermostat control pattern, a pattern related to when lighting devices are turned on and off, a pattern of appliance usage, etc.). After determining the presence pattern and the device usage pattern, the system 200 may compare the device usage pattern with the presence pattern and identify areas in which the patterns do not match. For example, the system 200 may determine that lighting devices are typically turned on and the thermostat is cooling or heating the property for long stretches in which the property is unoccupied. In this example, the system 200 may determine that this pattern is inefficient and adjust (or suggest adjustment) of the device usage pattern to more closely match the presence pattern. Further, when the device usage pattern suggests that devices are not operated in a preferred manner when the property is occupied (e.g., the thermostat is turned off or requires a delay to restore a temperature to a target temperature), the system 200 may enhance property automation and user convenience by controlling the lighting devices and the thermostat to prepare a property for when a user is expected to be present at the property.

In addition, the system 200 may monitor energy consumption at the property and use the monitored energy consumption to determine which types of energy control operations to perform. For instance, when energy consumption has been measured at a relatively high level for a time period, the system 200 may control energy consuming devices (e.g., lighting devices, thermostats, etc.) to conserve energy at all times when presence at the property is not detected. Alternatively, when energy consumption has been measured at a relatively low level for a time period, the system 200 may control energy consuming devices (e.g., lighting devices, thermostats, etc.) to prepare the property for anticipated occupancy based on presence patterns, even though no activity has been detected within the property.

The system 200 may perform several different, types of operations related to controlling the one or more energy consuming devices. For example, the system 200 may automatically, without user intervention, control the one or more energy consuming devices based on the analysis of the monitored sensor data and monitored device status. In another example, the system 200 may send alerts or display suggested changes to a user based on the analysis of the monitored sensor data and monitored device status. In this example, the system 200 does not control the one or more energy consuming devices until the system 200 receives user input authorizing suggested changes or defining what changes should be made. Users may determine how much control over the one or more energy consuming devices to give to the system 200 and the system 200 may determine which type of operation to perform based on user preference.

FIG. 4 illustrates example rules for controlling one or more energy consuming devices based on monitored sensor data and the monitored device status. As shown, the example rules include several attribute columns 401-409 that represent attributes used in assessing the example rules and an action column 410 that defines an action to be performed when the conditions for a rule are met. The attribute columns 401-409 include a presence area number one column 401, a presence area number two column 402, a window column 403, a door column 404, a weather column 405, a user column 406, a temperature column 407, an energy usage column 408, and a geographic location column 409. Although the example rules shown in FIG. 4 include nine attributes, the nine attributes represent example attributes and actual implementations may include more (or fewer) attributes.

The presence area number one column 401 defines how presence (or lack thereof) detected in a particular area within a property impacts evaluation of a rule. The presence within area number one may be sensed using a motion sensor, a contact sensor, an image sensor or any other sensor that enables a system to determine whether area number one is occupied. The presence area number two column 402 is similar to the presence area number one column 401, but refers to a second area. The second area may be a different area within the same property as the first area or may be an area within a separate property from the property that includes the first area.

The window column 403 defines how an open or closed state of one or more windows within a property impacts evaluation of a rule and the door column 404 defines how an open or closed state of one or more doors within a property impacts evaluation of a rule. The open or closed state of the one or more windows may be sensed by a contact sensor positioned at each of the one or more windows and the open or closed state of the one or more doors may be sensed by a contact sensor positioned at each of the one or more doors.

The weather column 405 defines how forecasted weather impacts evaluation of a rule. The weather data used to evaluate conditions set in the weather column 405 may be received from a weather feed and may include any number of relevant weather parameters, such as forecasted temperature, forecasted humidity, forecasted wind speeds, and forecasted precipitation (e.g., rain, snow, sleet, sun, etc.).

The user column 406 defines how a user identity associated with an event impacts evaluation of a rule. The user identity associated with an event may be determined using any type of mechanism (e.g., biometric recognition techniques, user specific alarm entry codes, etc.) and allows the rules to apply user-specific device control preferences of specific users.

The temperature column 407 defines how a measured temperature of a thermostat impacts evaluation of a rule and the energy measure column 408 defines how an energy measure of one or more energy consuming devices within a property impacts evaluation of a rule. The energy measure may relate to energy consumed by a single device (e.g., a heating and cooling system controlled by a thermostat) or a collective energy measure of several (e.g., all) energy consuming devices at one or multiple properties (e.g., a collective measure of energy consumed by a heating and cooling system controlled by a thermostat, lighting devices, and appliances at a property). The energy measure may be a direct measure of energy consumed by one or more devices, an estimated energy measure based on a time of operation and an average energy usage per time, or a combination of the two. The energy measure may be expressed as a measure in terms of energy usage or a cost of energy used based on utility company rate. The rules may define specific energy usage thresholds or may specify energy usage ranges (e.g., high, medium, low).

The geographic location column 409 defines how a geographic location of a user impacts evaluation of a rule. The geographic location may be determined using any type of mechanism (e.g., GPS, cellular tower triangulation, etc.) and allows the rules to be customized based on how close the user is to the monitored property.

The example rules include rules 411-426 that each define an action that is to occur when one or more conditions defined in the attribute columns 401-409 are met. The rules 411-426 may be system defined rules applicable to multiple (e.g., all) properties or may be user customized rules set based on user input indicative of the user's preferences. Although the example rules shown in FIG. 4 include sixteen rules, the sixteen rules represent example rules and actual implementations may include more (or fewer) rules. In addition, any combination of the attributes defined in the attribute columns may be used to set a rule.

The rule 411 defines that, when presence is not detected within the first area and presence is not detected within the second area, the system 200 turns off all lights associated with the first and second areas and sets all thermostats associated with the first and second areas to a conserve mode. The rule 412 defines that, when presence is not detected within the first area and presence is detected within the second area, the system 200 turns off lights associated with the first area and sets a thermostat associated with the first area to a conserve mode. Because presence is detected within the second area, the rule 412 allows the lighting devices and thermostat associated with the second area to be maintained at their current settings. The rule 413 defines that, when presence is detected within the first area and presence is not detected within the second area, the system 200 turns off lights associated with the second area and sets a thermostat associated with the second area to a conserve mode. Because presence is detected within the first area, the rule 413 allows the lighting devices and thermostat associated with the first area to be maintained at their current settings.

The rule 414 defines that, when a window is detected as being open, the system 200 sends an alert to the user to indicate the open window when a thermostat for an area corresponding to the open window is set to a cooling or heating mode. In this regard, the rule 414 alerts the user to an inefficient energy usage situation and enables the user to take appropriate action.

The rule 415 defines that, when a door is detected as being open, the system 200 automatically, without human intervention, controls a thermostat for an area corresponding to the open door to stop cooling or heating. In this regard, the rule 415 automatically reduces energy loss caused an inefficient energy usage situation.

The rule 416 defines that, when a temperature measured by a thermostat becomes higher than eighty-five degrees, the system 200 controls the thermostat to a cooling mode regardless of other attribute values at the time of the eighty-five degree temperature. In this regard, the rule 416 defines a maximum high temperature the property is supposed to maintain at all times.

The rule 417 defines that, when a temperature measured by a thermostat becomes lower than forty-five degrees, the system 200 controls the thermostat to a heating mode regardless of other attribute values at the time of the forty-five degree temperature. In this regard, the rule 417 defines a minimum low temperature the property is supposed to maintain at all times.

The rule 418 defines that, when presence is not detected within the first area, presence is not detected within the second area, and a user is detected as being less than one mile from the property, the system 200 sends a message to the user to suggest light and appliance control. For instance, the message may suggest turning on lights at the property and pre-heating an oven to prepare the property for the user's anticipated arrival in the near future. The system 200 may perform lighting and appliance control based on user input received in response to the message.

The rule 419 defines that, when presence is not detected within the first area, presence is not detected within the second area, and a user is detected as being less than five miles from the property, the system 200 automatically, without human intervention, controls the thermostat to a scheduled heating or cooling mode. In this regard, the rule 419 automatically prepares a temperature of the property to a condition suitable for occupation when the user is expected to arrive at the property. The system 200 attempts to automatically start a heating or cooling process with sufficient time prior to the user's expected arrival to adjust the temperature to a suitable level by the time the user arrives at the property.

In some implementations, the threshold distance at which the automatic start of the heating or cooling process begins may be dynamically set based on how close the current temperature is to the desired temperature, how long it typically takes the system to adjust the temperature from the current temperature to the desired temperature, and how long it typically takes the user to travel a particular distance. In these implementations, the system 200 may set the threshold distance to one mile when the current temperature is two degrees above the desired temperature, it typically takes the cooling system two minutes to cool the property two degrees, and it typically takes the user two minutes to travel to the property from one mile away. As another example, the system 200 may set the threshold distance to ten miles when the current temperature is twenty degrees above the desired temperature, it typically takes the cooling system twenty minutes to cool the property twenty degrees, and it typically takes the user twenty minutes to travel to the property from ten miles away.

The rule 420 defines that, when presence is not detected within the first area, presence is not detected within the second area, and a user is detected as being more than five miles from the property, the system 200 automatically, without human intervention, controls the thermostat to a conserve mode. In this regard, the rule 420 automatically conserves energy used in heating or cooling the property when the user is unlikely to occupy the property for an extended period of time.

The rule 421 defines that, when presence is detected within the first area, presence is not detected within the second area, and user one is detected as being the user present in the first area, the system 200 controls energy consuming devices associated with the first area based on user one's preferences. The rule 422 defines that, when presence is detected within the first area, presence is not detected within the second area, and user two is detected as being the user present in the first area, the system 200 controls energy consuming devices associated with the first area based on user two's preferences. In this regard, the rules 421 and 422 enable user one and user two to automatically receive user-specific control over energy consuming devices within the property.

The rule 423 defines that, when presence is detected within the first area, presence is detected within the second area, the forecasted weather indicates a temperature between fifty and eighty degrees, and the energy measure at the property is at a relatively low level, the system 200 controls energy consuming devices in accordance with the scheduled mode. The rule 424 defines that, when presence is detected within the first area, presence is detected within the second area, the forecasted weather indicates a temperature between fifty and eighty degrees, and the energy measure at the property is at a relatively high level, the system 200 controls energy consuming devices in accordance with a conserve mode. In this regard, the rules 423 and 424 cause the system 200 to apply preferred cooling and heating when the energy measure level is relatively low and apply energy conservation cooling and heating when the energy measure level is relatively high and the forecasted temperatures do not anticipate extreme weather.

The rule 425 defines that, when a window is detected as being open and/or a door is detected as being open and the forecasted weather anticipates rain, the system 200 sends an alert to the user to close the window and/or door due to anticipated inclement weather. In this regard, the rule 425 alerts the user to a possible unpleasant situation and enables the user to take appropriate action.

The rule 426 defines a rule that uses all of the attributes in the attribute columns 401-409. Specifically, the rule 426 defines an action that occurs when presence is detected within the first area, when presence is detected within the second area, when a window is detected as being closed, when a door is detected as being closed, when the forecasted weather anticipates a temperature greater than ninety degrees, when the user associated with the detected presence is a pet, when the thermostat is set to an off state, when the energy measure is at a relatively high level, and the user is detected as being more than twenty miles away from the property. When the conditions specified by the rule 426 are met, the system 200 sends an alert to the user to set the thermostat to a cooling mode for the well-being of the pet. In this regard, the rule 426 alerts the user to a possible unhealthy situation for the pet and enables the user to take appropriate action.

FIG. 5 illustrates an interface 500 that enables user control over lighting devices and other appliances from a remote location. The interface 500 may be presented over a network (e.g., as a webpage on a personal computer) or may be displayed by an application that operates on a device (e.g., displayed by a native monitoring application on a mobile device). The interface 500 includes a lights (and other appliances) area 510. The area 510 includes controls 512 for controlling all lights within a property. As shown, the controls 512 include a first control that causes all lights within a property to be turned off and a second control that causes all lights within a property to be turned on.

The area 510 also includes controls 514 for controlling lights associated with a lights dimmer. The controls 514 include a first control that causes the lights associated with the lights dimmer to be turned off, a second control that causes the lights associated with the lights dimmer to be turned on, and a third control that controls a dimmer setting for the lights associated with the lights dimmer when turned on. The third control includes a slide bar that allows a user to set a dimmer percentage setting, which is shown adjacent to the slide bar.

The area 510 further includes controls 516 for controlling lights associated with a kitchen dimmer (e.g., lights positioned within a kitchen). The controls 516 include a first control that causes the lights associated with the kitchen dimmer to be turned off, a second control that causes the lights associated with the kitchen dimmer to be turned on, and a third control that controls a dimmer setting for the lights associated with the kitchen dimmer when turned on. The third control includes a slide bar that allows a user to set a dimmer percentage setting, which is shown adjacent to the slide bar.

In addition, the area 510 includes controls 518 for controlling a coffee maker. The controls 518 include a first control that causes the coffee maker to be turned off and a second control that causes the coffee maker to be turned on. Other types of devices and appliances may be controlled in a manner similar to the control of the coffee maker.

The interface 500 includes a scheduled automation area 530 and an event-triggered automation area 540. The scheduled automation area 530 displays time schedule automation that has been set for one or more devices controlled through the interface 500 and enables a user to add, delete, or change scheduled automations. As shown, a scheduled automation has been set for the lights dimmer to turn on at 10:00 PM and turn off at 7:00 AM every day of the week.

The event-triggered automation area 540 displays event-triggered automation that has been set for one or more devices controlled through the interface 500 and enables a user to add, delete, or change event-triggered automations. As shown, an event-triggered automation has been set for the lights dimmer to turn on for two minutes when a door sensor positioned on a work door closes. Any other types of time schedule and event-triggered automations may be set using the interface areas 530 and 540.

Figure 6:
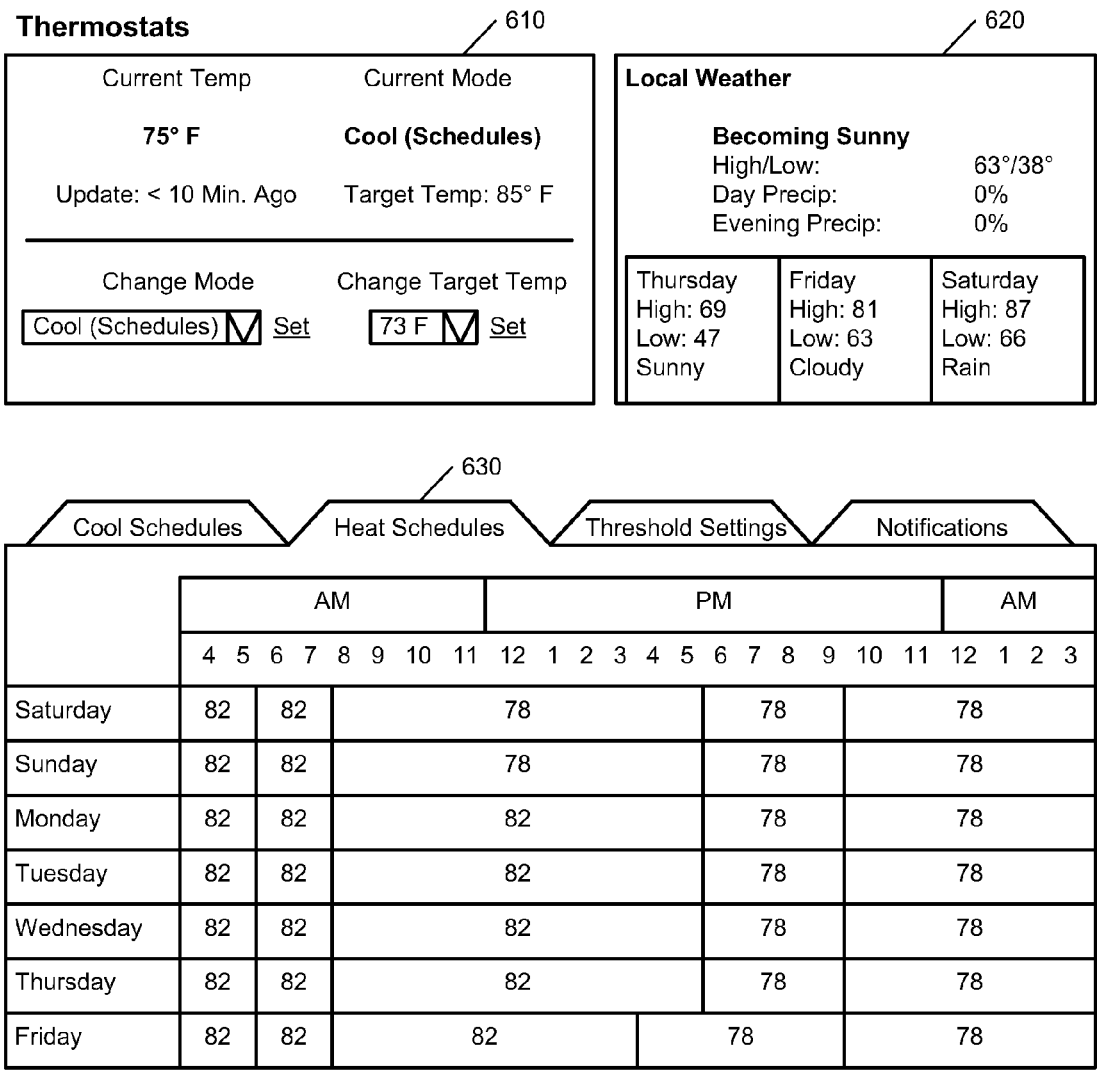

FIG. 6 illustrates an interface 600 that enables user control over a thermostat from a remote location. The interface 600 may be presented over a network (e.g., as a webpage on a personal computer) or may be displayed by an application that operates on a device (e.g., displayed by a native monitoring application on a mobile device). The interface 600 includes a thermostats area 610. The area 610 displays a current temperature measured by the thermostat, a current mode set for the thermostat, an indication of when the thermostat measurements were last updated, and a target temperature the thermostat is attempting to maintain at the property. The area 610 also includes a control that allows a user to set an operating mode of the thermostat and a control that allows a user to set a target temperature for the thermostat.

The interface 600 also includes a weather area 620. The weather area 620 displays a forecast of the current local weather at the property that is being monitored.

The interface further includes a heat schedules tab 630. The heat schedules tab 630 displays a timing schedule for the thermostat, which shows the target temperature set for time periods within a day for each day of the week. The timing schedule is used to change the target temperature of the thermostat throughout the course of a day when the heat schedule mode is set for the thermostat. The heat schedules tab 630 may enable a user to change the target temperatures and time ranges included in the heat schedule. The cool schedules tab may be similar to the heat schedules tab 630, but with target temperature data for the cool schedule mode.

FIG. 7 illustrates an interface 700 that shows the interface 600 after the threshold settings tab 710 has been selected. The threshold settings tab 710 displays threshold temperatures set for the thermostat and controls that change the thresholds. Specifically, the threshold settings tab 710 includes a low temperature threshold control and a high temperature threshold control. The low temperature threshold control enables a user to set a low temperature threshold and the high temperature threshold control enables a user to set a high temperature threshold. The thermostat maintains the temperature at the property to be at or above the low temperature threshold and at or below the high temperature threshold at all times regardless of other energy conservation efforts being taken with respect to the property.

Figure 8:
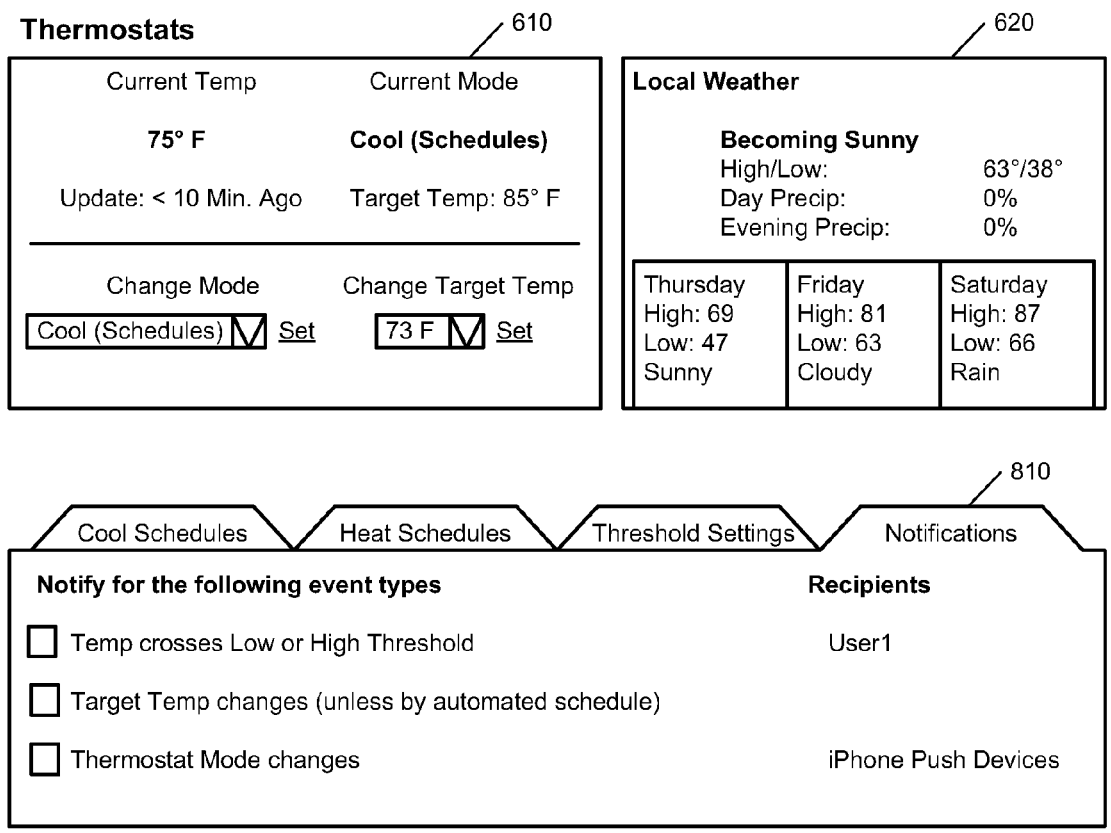

FIG. 8 illustrates an interface 800 that shows the interface 600 after the notifications tab 810 has been selected. The notifications tab 810 displays notifications set based on thermostat events. The notifications include an event portion that defines the thermostat event that triggers the notification and a recipient portion that defines the recipients of the notification. The monitoring system monitors for the thermostat events defined in the event portion and sends a notification to users identified in the recipient portion when a thermostat event is detected. The notifications tab 810 may enable a user to add, delete, or change set notifications.

Figure 9:
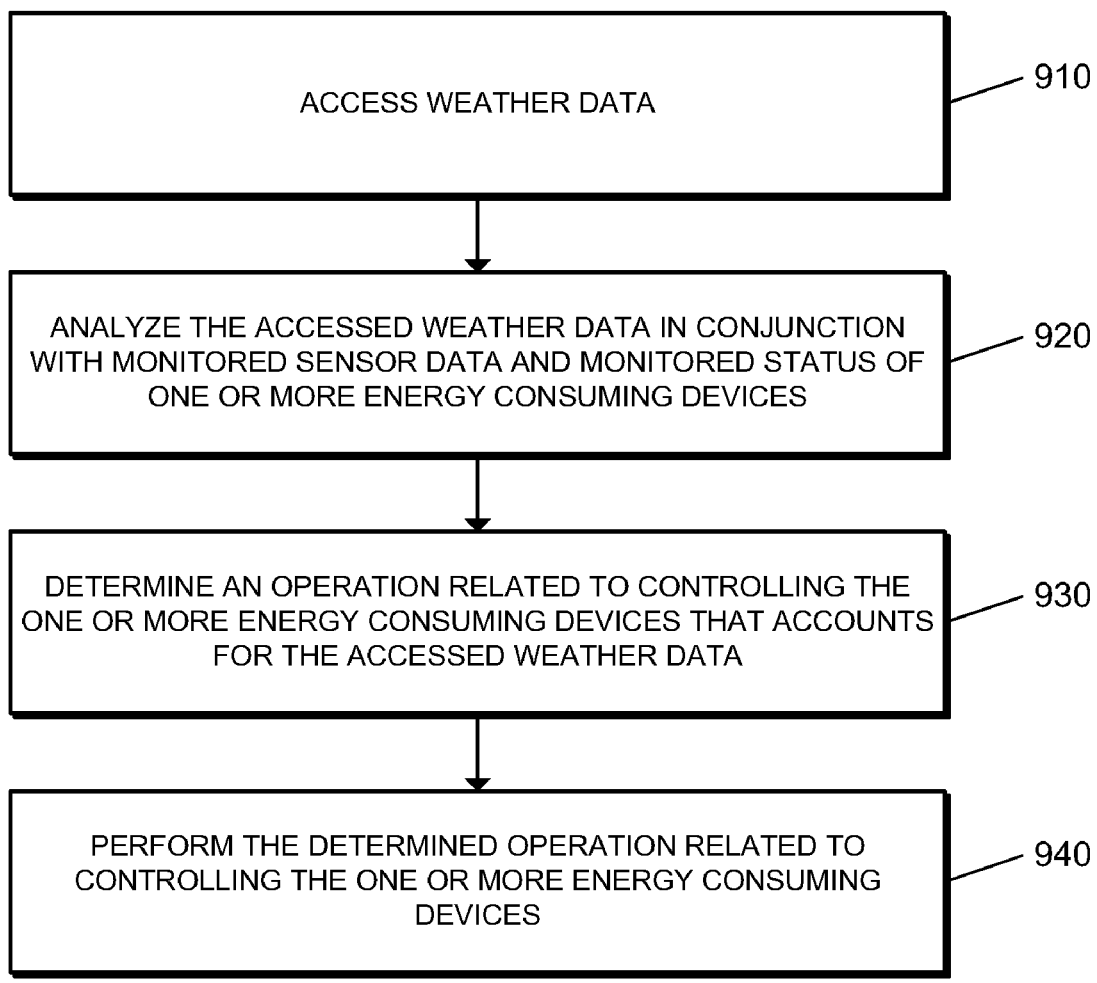

FIG. 9 illustrates an example process 900 for accounting for weather data in performing an operation related to controlling one or more energy consuming devices. The system 200 accesses weather data (910). For example, the system 200 receives current weather data from a weather feed provided by a weather broadcasting system. In this example, the system 200 may identify, from the weather feed, the weather data relevant to the geographic location of a monitored property and accounts for the identified weather data in performing an operation related to controlling one or more energy consuming devices at the monitored property.

The weather data may include a weather forecast for any types of weather conditions that are included in weather forecasts. For instance, the weather data may include anticipated high and low temperatures, anticipated chances of precipitation, and anticipated weather conditions (e.g., sunny, cloudy, rain, etc.).

The system 200 analyzes the accessed weather data in conjunction with monitored sensor data and monitored status of one or more energy consuming devices (920). For example, the system 200 applies the accessed weather data to a set of one or more rules in combination with the monitored sensor data and the monitored status of one or more energy consuming devices. In this example, the accessed weather data may impact which action the system 200 performs based on the monitored sensor data and the monitored status of one or more energy consuming devices.

The system 200 determines an operation related to controlling the one or more energy consuming devices that accounts for the accessed weather data (930) and performs the determined operation related to controlling the one or more energy consuming devices (940). The system 200 may determine and perform several different, types of operations related to controlling the one or more energy consuming devices that account for the accessed weather data. For example, the system 200 may automatically, without user intervention, control the one or more energy consuming devices based on the analysis of the accessed weather data in conjunction with the monitored sensor data and the monitored device status. In another example, the system 200 may send alerts or display suggested changes to a user based on the analysis of the accessed weather data in conjunction with the monitored sensor data and the monitored device status. In this example, the system 200 does not control the one or more energy consuming devices until the system 200 receives user input authorizing suggested changes or defining what changes should be made.

Figure 10:
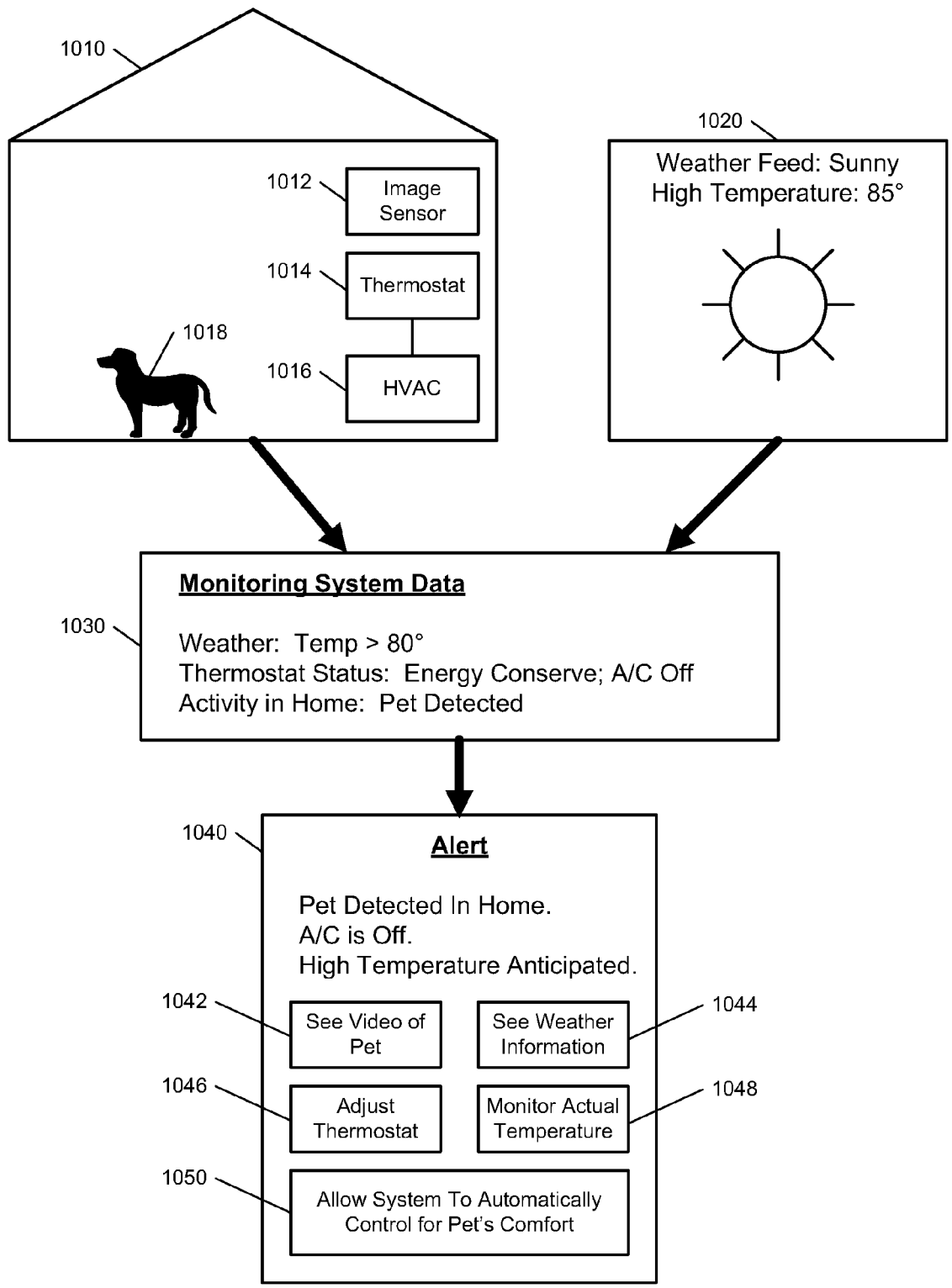
FIG. 10 illustrates an example of providing an alert based on monitoring system data and weather data.

FIG. 10 illustrates an example of performing an operation related to controlling one or more energy consuming devices determined in a manner that accounts for weather data. As shown, a property 1010 is monitored by a monitoring system. The property 1010 includes an image sensor 1012, a thermostat 1014, and a heating and cooling system 1016. The monitoring system monitors image data from the image sensor 1012 and monitors the state (e.g., the mode set, current temperature measured, etc.) of the thermostat 1014. The thermostat 1014 measures a temperature associated with the property 1010 and controls the heating and cooling system 1016 based on the measured temperature and a temperature control setting of the thermostat 1014.

In the example shown in FIG. 10, the monitoring system analyzes images captured by the image sensor 1012 and detects presence of a pet 1018 within the property 1010 based on the analysis of the images. The monitoring system also detects that the thermostat 1014 is operating in an energy conserve mode in which the air conditioner is turned off. The monitoring system further receives weather data 1020 that indicates that the weather forecast is sunny with an anticipated high temperature of eighty-five degrees. The monitoring system accumulates all this monitored data in the monitoring system data 1030. As shown, the monitoring system data 1030 indicates that the weather has an anticipated temperature greater than eighty degrees, that the thermostat 1014 is operating in an energy conserve mode in which the air conditioner is turned off, and that the sensed activity in the property 1010 suggests a pet being present in the property 1010.

The monitoring system analyzes the monitoring system data 1030 with respect to one or more rules and determines that an action is needed based on the monitored attributes stored in the monitoring system data 1030. As shown, the monitoring system determines that an alert 1040 should be sent to one or more users associated with the property 1010 based on the monitored sensor data, the monitored device status, and the anticipated weather. The alert 1040 provides a message indicating current values for the sensed activity with the property 1010, the status of an energy consuming device within the property 1010, and the anticipated weather to enable the one or more users to assess the potentially unhealthy situation for the pet and take action accordingly.

The alert 1040 includes multiple options for a user to respond to the situation. For example, the alert 1040 includes an input control 1042 that enables a user to see video of the pet. A user may activate the input control 1042 to see images captured by the image sensor 1012 and attempt to assess the comfort level of the pet to gain more information about the situation.

The alert 1040 also includes an input control 1044 that enables a user to receive more detailed information related to the weather forecast. A user may activate the input control 1044 to see more detailed weather information and attempt to assess the likelihood of the pet being placed in a dangerous situation.

The alert 1040 further includes an input control 1046 that enables a user to adjust the thermostat. A user may activate the input control 1046 to display a thermostat adjustment interface with which the user can provide input and set the thermostat to an appropriate setting for comfort of the pet.

In addition, the alert 1040 includes an input control 1048 that causes the monitoring system to monitor actual temperature within the property 1010. A user may activate the input control 1048 to cause the monitoring system to monitor an actual temperature with the property 1010 and provide the user an additional alert when the temperature begins rising to an unsafe level. In this regard, the input control 1048 enables the user to delay the thermostat control decision until the actual temperature suggests a problem for the pet, rather than basing the decision on a speculative weather forecast.

Further, the alert 1040 includes an input control 1050 that allows the monitoring system to automatically control the thermostat 1014 for the pet's comfort. When the user activates the input control 1050, the monitoring system automatically, without human intervention, controls the thermostat 1014 to maintain a temperature that is comfortable for the pet while attempting to conserve energy in any opportunity where the energy conservation would not jeopardize the safety or comfort of the pet. The monitoring system may include pet health monitoring devices (e.g., a temperature sensor for the pet) and may control the thermostat 1014 based on the health monitoring data for the pet.

Figure 11:
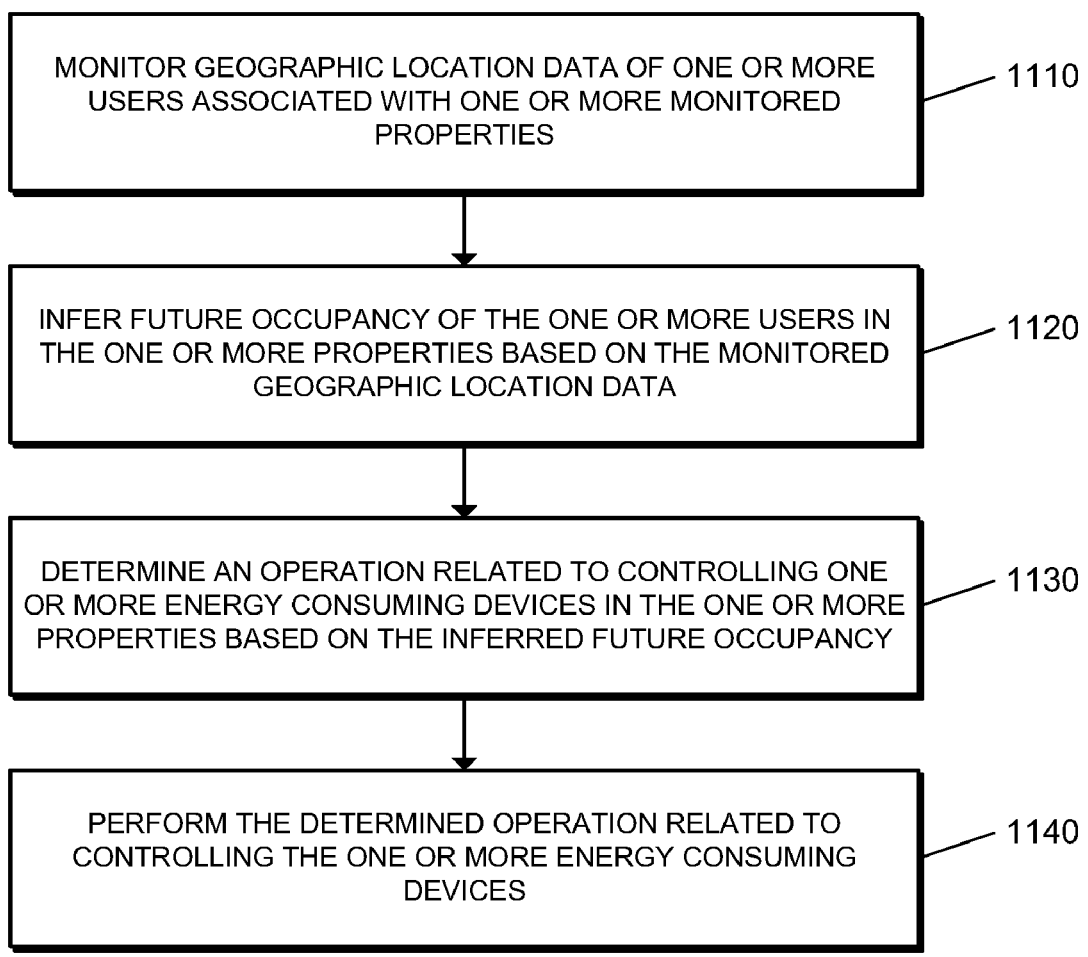

FIG. 11 illustrates an example process 1100 for accounting for geographic location data in performing an operation related to controlling one or more energy consuming devices. The system 200 monitors geographic location data of one or more users associated with one or more monitored properties (1110). For example, the system 200 determines a geographic location of one or more users associated with a monitored property. In this example, the system 200 may determine geographic location using any type of mechanism for determining a geographic location of a user. For instance, the system 200 may use GPS data to determine a geographic location, may use cell tower triangulation to determine a geographic location, or may use an IP address of a device being operated by the user to determine a geographic location. The system 200 may determine and monitor a geographic location of one or more users relative to a geographic location of a monitored property (e.g., within a particular number of miles).

The system 200 also may monitor geographic location data over time to determine a direction in which a user is currently traveling or determine typical travel schedules or patterns for a user. The system 200 may use the determined direction to determine whether the user is moving toward or away from a monitored property. The system 200 may use the typical travel schedules or patterns for the user to determine when a user typically travels to a property.

The system 200 infers future occupancy of the one or more users in the one or more properties based on the monitored geographic location data (1120). For instance, the system 200 may infer future occupancy of a monitored property based on how close a user is to the monitored property. The system 200 may determine that a user within one mile of a property will occupy the property within a relatively short period of time, a user within five miles of a property will occupy the property within a relatively medium period of time, and a user outside of ten miles from a property will occupy the property within a relatively long period of time.

In inferring future occupancy of the one or more users in the one or more properties based on the monitored geographic location data, the system 200 may consider a direction of travel determined for the one or more users. For example, when a user is moving toward the property at a particular distance from the property, the system 200 may determine that the user will occupy the property within a relatively short period of time and, when a user is moving away from the property at the particular distance from the property, the system 200 may determine that the user will occupy the property within a relatively long period of time. The system 200 also may consider a rate at which a user is traveling in inferring a time when future occupancy is expected.

In some implementations, the system 200 may use typical travel schedules or patterns for a user in inferring future occupancy. In these implementations, the system 200 may analyze the typical travel schedules or patterns for the user and infer times when the typical travel schedules or patterns suggest that the user will occupy the property.

The system 200 determines an operation related to controlling the one or more energy consuming devices based on the inferred future occupancy (1130) and performs the determined operation related to controlling the one or more energy consuming devices (1140). The system 200 may determine and perform several different, types of operations related to controlling the one or more energy consuming devices based on the inferred future occupancy. For example, the system 200 may automatically, without user intervention, control the one or more energy consuming devices based on the inferred future occupancy. In another example, the system 200 may send alerts or display suggested changes to a user based on the inferred future occupancy. In this example, the system 200 does not control the one or more energy consuming devices until the system 200 receives user input authorizing suggested changes or defining what changes should be made.

In some examples, the system 200 may perform one or more operations related to preparing a monitored property for anticipated occupation when the inferred future occupancy suggests that the monitored property will be occupied in a relatively short period of time. These operations may include automatically controlling a thermostat to adjust the temperature at the monitored property to a preferred level for the user that is expected to occupy the property in the near future or suggesting that lighting devices and/or appliances within the monitored property be turned on to prepare the property for occupation.

In some implementations, the system 200 may perform one or more operations related to conserving energy when the inferred future occupancy suggests that the monitored property will not be occupied for a relatively long period of time. These operations may include automatically setting a thermostat to an energy conserve mode or ensuring that lighting devices and/or appliances within the monitored property are turned off.

Figure 12:
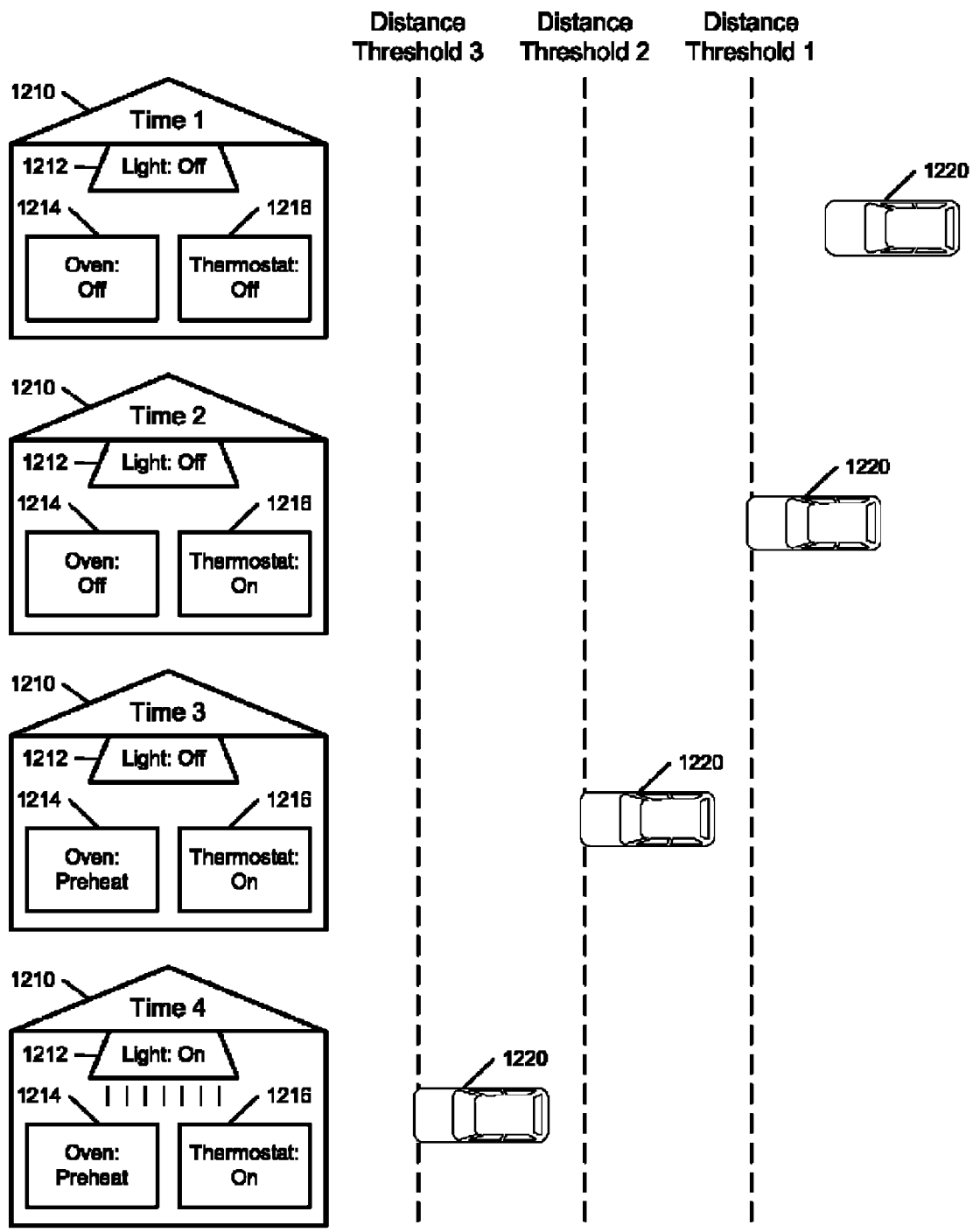
FIG. 12 illustrates an example of controlling devices in a property based on geographic proximity of a user to the property.

FIG. 12 illustrates an example of performing an operation related to controlling one or more energy consuming devices based on inferred future occupancy. As shown, a property 1210 is monitored by a monitoring system. The property 1210 includes a lighting device 1212, an oven 1214, and a thermostat 1216. The monitoring system controls the lighting device 1212, the oven 1214, and the thermostat 1216 in accordance of a geographic location of a user 1220 driving toward the property 1210 in an automobile. In this example, the monitoring system monitors three distance thresholds with respect to the geographic position of the user 1220 and, as shown, the example illustrates four, different times with four, different geographic locations of the user 1220.

At a first time, the monitoring system determines that a geographic location of the user 1220 is outside of a first distance threshold that is furthest from the property 1210. Because the geographic location of the user 1220 is outside of the first distance threshold, the monitoring system maintains the lighting device 1212, the oven 1214, and the thermostat 1216 in an off state to conserve energy.

At a second time, the monitoring system determines that a geographic location of the user 1220 is within the first distance threshold, but remains outside of a second distance threshold that is closer to the property 1210 than the first distance threshold. Because the geographic location of the user 1220 has reached the first distance threshold, the monitoring system turns the thermostat 1216 to an on state to begin controlling a heating and/or cooling system of the property 1210 to cool or heat the property 1210 to a suitable temperature for the user 1220. Because the geographic location of the user 1220 has not reached the second distance threshold, the monitoring system maintains the lighting device 1212 and the oven 1214 in an off state to conserve energy.

At a third time, the monitoring system determines that a geographic location of the user 1220 is within the second distance threshold, but remains outside of a third distance threshold that is closer to the property 1210 than the second distance threshold. Because the geographic location of the user 1220 has reached the second distance threshold, the monitoring system turns the oven 1214 to a preheat state to begin preparing the oven for use by the user 1220. Also, because the geographic location of the user 1220 remains within the first distance threshold, the monitoring system maintains the thermostat 1216 in the on state. Further, because the geographic location of the user 1220 has not reached the first distance threshold, the monitoring system maintains the lighting device 1212 in an off state to conserve energy.

At a fourth time, the monitoring system determines that a geographic location of the user 1220 is within the third distance threshold. Because the geographic location of the user 1220 has reached the third distance threshold, the monitoring system turns lighting device 1212 to an on state to provide light for the user 1220 when the user arrives home. Also, because the geographic location of the user 1220 remains within the first distance threshold, the monitoring system maintains the thermostat 1216 in the on state. Further, because the geographic location of the user 1220 remains within the second distance threshold, the monitoring system maintains the oven 1214 in the preheat state.

In the example shown in FIG. 12, the monitoring system prepares the property 1210 for arrival by the user 1220 based on the distance thresholds, which are used to infer when the user 1220 is expected to arrive at the property. Preparing the property 1210 in this manner may provide the user 1220 with enhanced convenience because the property 1210 is ready for the user 1220 at a time when the user 1220 arrives home. Moreover, because the monitoring system monitors multiple thresholds and only activates energy consuming devices when the energy consuming devices are anticipated as being needed, the monitoring system provides as much energy conservation as possible while providing enhanced home automation features for the user 1220.

Figure 13:
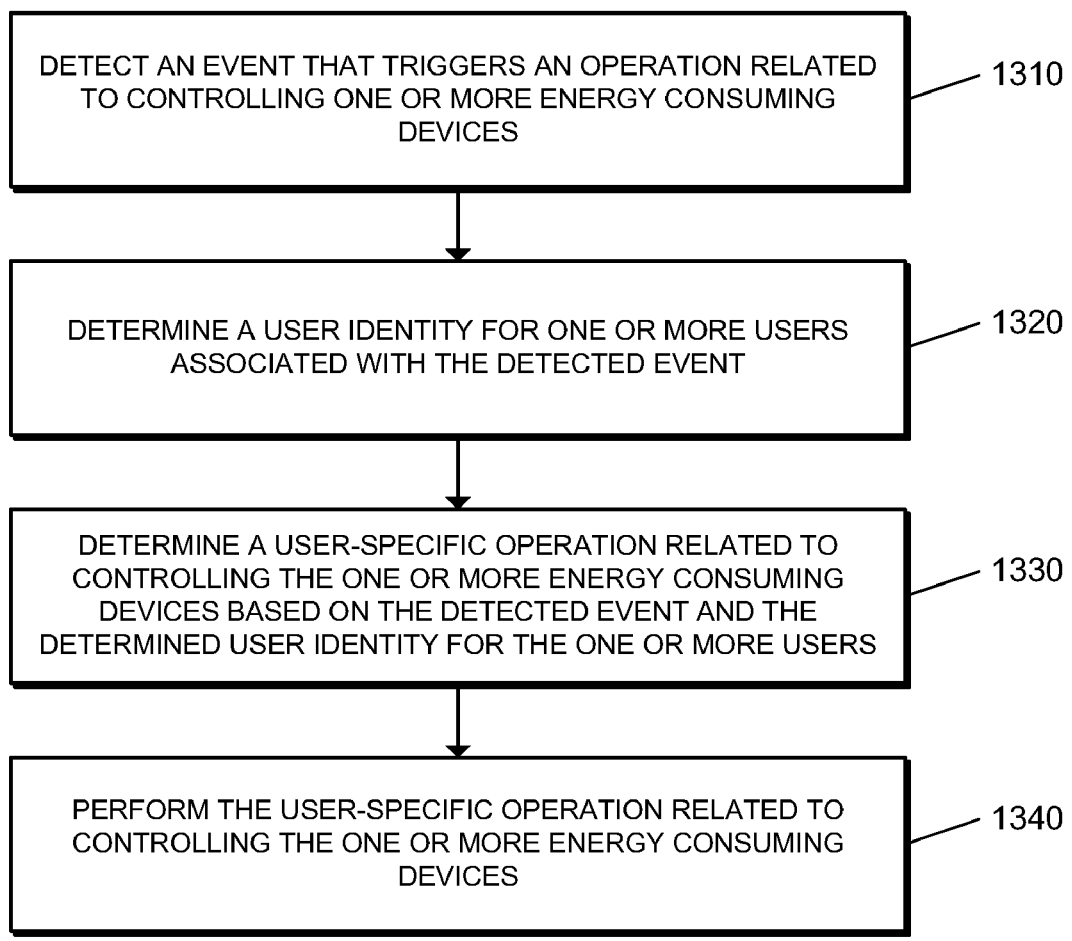

FIG. 13 illustrates an example process 1300 for accounting for user identity in performing an operation related to controlling one or more energy consuming devices. The system 200 detects an event that triggers an operation related to controlling one or more energy consuming devices (1310). For instance, the system 200 determines that monitored attributes described throughout this disclosure (e.g., sensor data, device status, etc.) indicate performance of an action defined by a rule.

In some implementations, the event may be a standalone event that triggers an operation. In these implementations, the event may be a motion sensor detecting motion within a property or a disarm event for a security system.

In some examples, the event may be part of a string of multiple events that trigger an operation. In these examples, the event may be part of a pattern of events that is detected by the system 200. When the system 200 detects the pattern of events, the system 200 triggers an operation based on the pattern of events.

The system 200 determines a user identity for one or more users associated with the detected event (1320). The system 200 may use any technique to determine a user identity of a user. For example, when the detected event relates to presence within a property, the system 200 may analyze image data of the property in an attempt to determine an identity of the user that is present in the property. In this example, the system 200 may process the image data using facial or body type recognition techniques to identify an identity of the user. The system 200 may use other types of biometric data (e.g., fingerprint scans) to identify a user.

In another example, when the detected event relates to arming or disarming of a security system, the system 200 may determine an identity of the user based on a user-specific code used to arm or disarm the security system. In this example, the system 200 may assign different codes to different users and detect user identity by determining the identity assigned to the code entered to arm or disarm the security system.

In some implementations, the system 200 may determine an identity of the user based on which sensors in a property have been triggered. For instance, the system 200 may determine that a first user is in the property when a door sensor on the first user's bedroom detects a door opening and may determine that a second user is in the property when a door sensor on the second user's bedroom detects a door opening.

The system 200 also may determine multiple user identities when multiple users are associated with an event. For example, when multiple users are within a property, the system 200 may determine a user identity for each of the multiple users.

The system 200 determines a user-specific operation related to controlling the one or more energy consuming devices based on the detected event and the determined user identity for the one or more users (1330) and performs the user-specific operation related to controlling the one or more energy consuming devices (1340). The system 200 may determine and perform several different, types of operations related to controlling the one or more energy consuming devices based on the detected event and the determined user identity for the one or more users. For example, the system 200 may automatically, without user intervention, control the one or more energy consuming devices based on the determined user identity for the one or more users. In another example, the system 200 may send alerts or display suggested changes to an identified user based on the determined user identity for the one or more users.

The operation performed for the same detected event may be different for different users. For instance, when a first user is detected as being present in a property, a thermostat for the property may be set to a first temperature preferred by the first user. However, when a second user is detected as being present in the property, the thermostat for the property may be set to a second temperature, which is preferred by the second user and different than the first temperature. As another example, when a first user is detected as approaching a property, a lighting device that lights a bedroom of the first user may be turned on and, when a second user is detected as approaching the property, a lighting device that lights a bedroom of the second user may be turned on. Further, when a window is detected as being open at a time when a thermostat is controlling a heating and/or cooling system to operate and a first user is present in the property, an alert may be sent to the first user to identify the situation. However, when a window is detected as being open at a time when the thermostat is controlling the heating and/or cooling system to operate and a second user is present in the property, the thermostat may be automatically controlled to turn the heating and/or cooling system off.

In examples in which the system detects identities for multiple users, the system 200 performs operations related to controlling the one or more energy consuming devices in accordance with preferences of each identified user to the extent possible. For instance, the system 200 analyzes the preferences for each identified user and determines whether any conflicts exist (e.g., a first user prefers a different temperature than a second user). When the system 200 determines that no conflicts exist, the system 200 applies the preferences of all of the identified users. However, when the system 200 detects one or more conflicts, the system 200 resolves the conflicts based on user priority or privileges data. For instance, when both a parent user and a child user are detected within a property and have conflicting preferences, the system 200 may determine to apply the preferences of the parent user because the parent user has superior priority to the child user.

In some examples, the system 200 resolves conflicts for each specific action that is triggered. For instance, when both a parent user and a child user are detected within a property and have conflicting temperature preferences, the system 200 may determine to control a first thermostat associated with the child user's room to a preferred temperature of the child and control a second thermostat associated with the parent user's room to a preferred temperature of the parent.

Figure 14A:
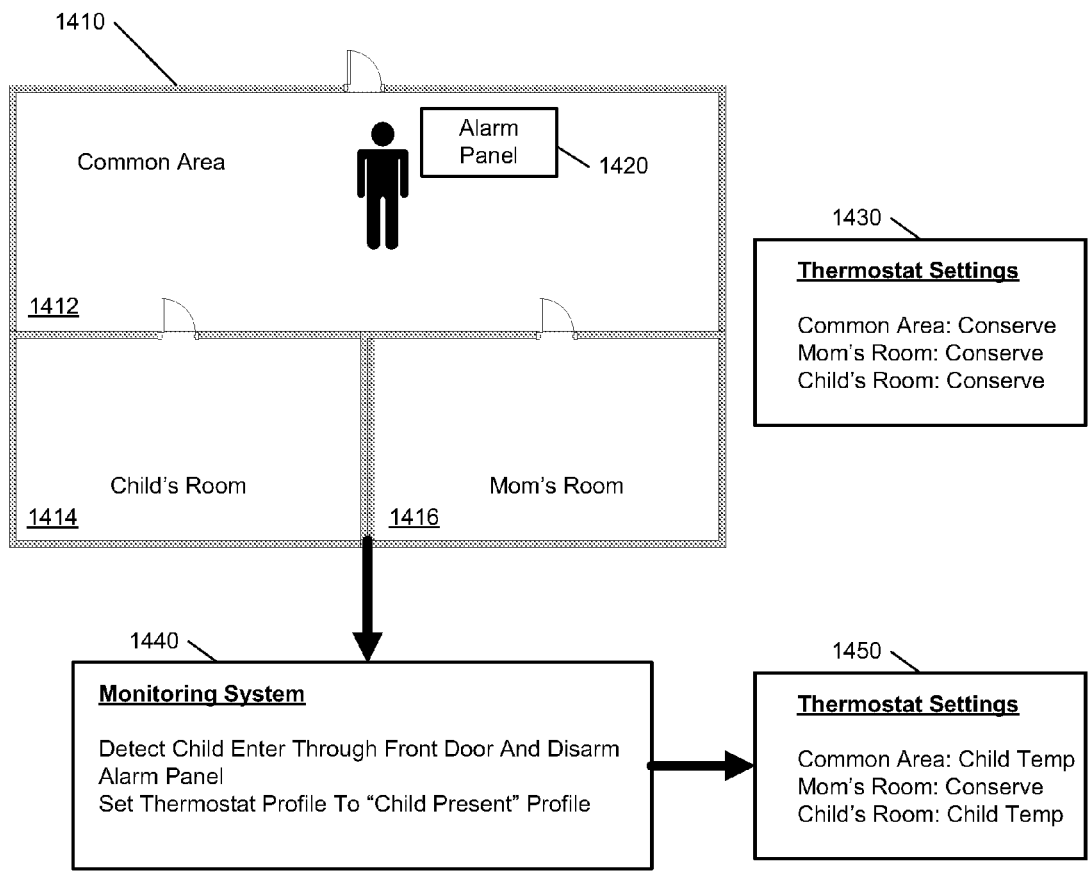
FIGS. 14A and 14B illustrate examples of controlling devices based on detected user identity.
Figure 14B:
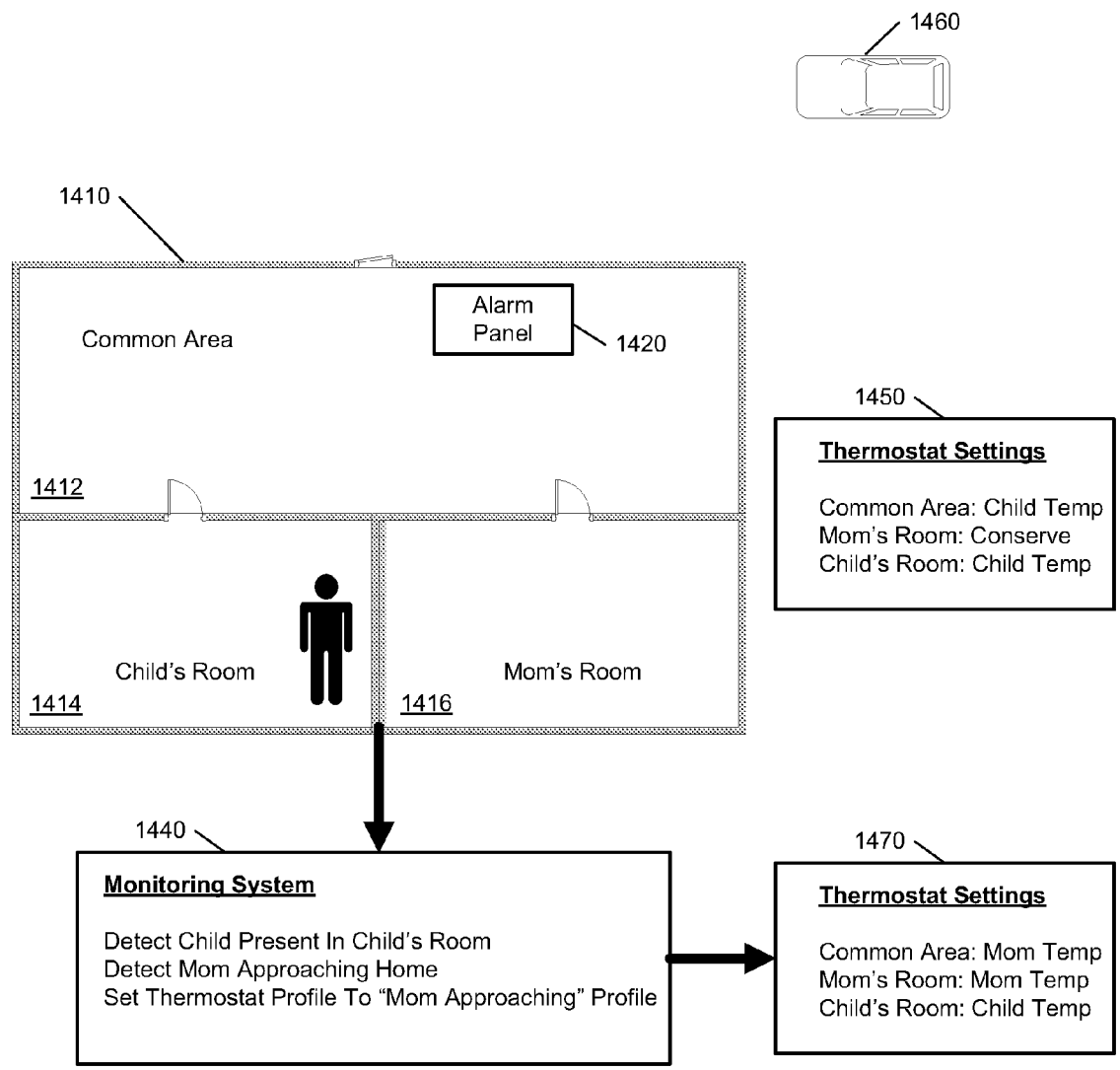

FIGS. 14A and 14B illustrate examples of performing user-specific operations related to controlling one or more energy consuming devices. As shown in FIG. 14A, a property 1410 includes a common area 1412, a child's room 1414, and a mom's room 1416. The property 1410 also includes an alarm panel 1420 that controls a security system that monitors the property 1410. The property 1410 has thermostat controls that enable separate control of the common area 1412, the child's room 1414, and the mom's room 1416. The thermostat settings 1430 illustrate that the common area 1412, the child's room 1414, and the mom's room 1416 are all set to a conserve mode when no users are present in the property 1410.

In the example shown in FIG. 14A, a child arrives home through a front door and enters a child-specific code at the alarm panel 1420 to disarm the security system of the property 1410. The monitoring system 1440 detects entry into the property 1410 based on output from a door sensor at the front door and detects the disarm event at the alarm panel 1420. Based on the detected entry and disarm event, the monitoring system 1440 determines that thermostat settings should be changed from the thermostat settings 1430 to settings appropriate for a user being present in the property 1410. In determining how to change the thermostat settings, the monitoring system 1440 determines an identity associated with the user that entered the property and disarmed the security system. In this example, the monitoring system 1440 determines that the child-specific code was used to disarm the security system and, therefore, determines that the child has entered the property 1410.

In response to the determinations that the thermostat settings need to be changed and that the child is present in the property 1410, the monitoring system 1440 changes the thermostat setting to a "Child Present" profile that is appropriate for when the child is present in the property 1410 alone and reflects the preferences of the child. Accordingly, the monitoring system 1440 changes the thermostat settings 1430 to the thermostat settings 1450 in which the common area 1412 and the child's room 1414 have been set to the child's preferred temperature. A thermostat setting for the mom's room 1416 has been maintained in a conserve mode because the child is unlikely to enter the mom's room 1416 and, as such, is unlikely to be impacted by the temperature in the mom's room 1416.

The example shown in FIG. 14B represents user-specific control that occurs when the child is present in the property 1410 and the mom is inferred to be arriving at the property 1410 soon. In this example, the monitoring system 1440 monitors a geographic location of the mom's automobile 1460 and infers that the mom is approaching the property 1410 based on the monitored geographic location. The monitoring system 1440 determines that it is the mom approaching the property 1410 because the geographic location data processed by the monitoring system 1440 is being received from a device associated with the mom (e.g., a navigation system of the mom's automobile 1460). The monitoring system 1440 determines that the child remains present within the property 1410 in the child's room 1414 (e.g., based on motion sensor activity in the child's room 1414 or door openings and closings detected at the child's room 1414).

In response to the determinations that the mom is approaching the property 1410 and that the child is in the child's room 1414, the monitoring system 1440 changes the thermostat setting to a "Mom Approaching" profile that is appropriate for when the child is present in the child's room 1414 alone and the mom is inferred to be arriving at the property 1410 in a relatively short period of time. In applying the "Mom Approaching" profile, the monitoring system 1440 changes the thermostat settings 1450 to the thermostat settings 1470 in which the common area 1412 and the mom's room 1416 have been set to the mom's preferred temperature, and the child's room 1414 has been set to the child's preferred temperature.

In changing the thermostat settings, the monitoring system 1440 analyzed the preferences of the mom and the child and determined that the mom's preferred temperature was different than the child's preferred temperature. Because the child has superior rights to the mom in the child's room 1414, the monitoring system 1440 maintained the child's room 1414 set to the child's preferred temperature. Because the mom has superior rights to the child in the common area 1412 and the mom's room 1416, the monitoring system 1440 changed the common area 1412 and the mom's room 1416 to the mom's preferred temperature.

In some implementations, the child's rights may be impacted by the location of the child within the property 1410. In these implementations, the monitoring system 1440 may have determined that the child had superior rights to the temperature in the common area 1412 (at least until the mom actually arrived at the property 1410) had the child been detected as being present in the common area 1412, as opposed to the child's room 1414. In this regard, had the monitoring system 1440 detected the child as being present in the common area 1412, the monitoring system 1440 would have maintained the common area 1412 set to the child's preferred temperature. The monitoring system 1440 then would have waited to change the temperature of the common area 1412 to the mom's preferred temperature until the mom actually arrives at the property 1410 or the child is detected as leaving the common area 1412.

Figure 15:
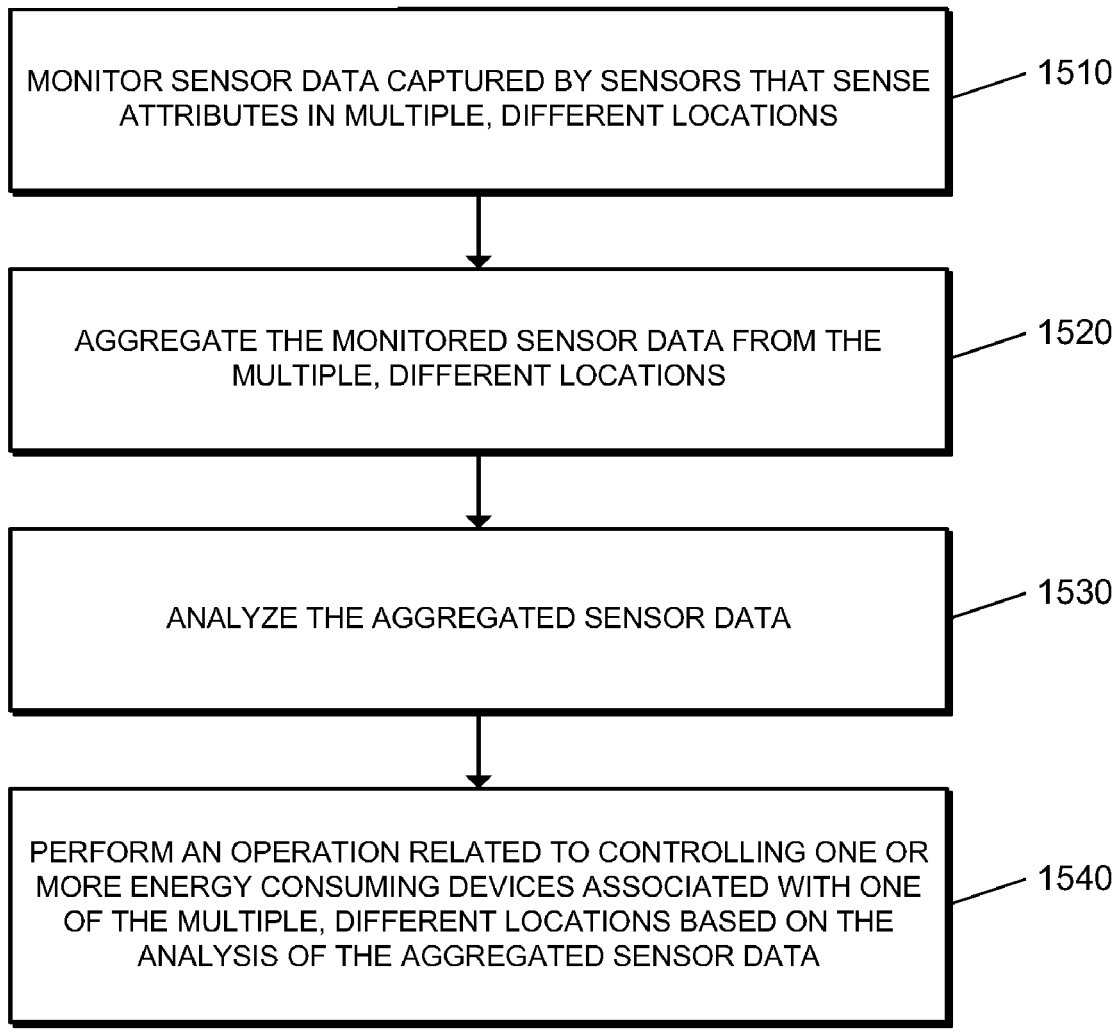

FIG. 15 illustrates an example process 1500 for accounting for sensor data from multiple, different locations in performing an operation related to controlling one or more energy consuming devices. The system 200 monitors sensor data captured by sensors that sense attributes in multiple, different locations (1510). For instance, the system 200 may use techniques similar to those discussed above with respect to reference numeral 310 to sense attributes. The system 200 may sense attributes in multiple, different locations. The system 200 may monitor sensor data from multiple, different areas within a single monitored property (e.g., sensor data from different levels or rooms within a house) or may monitor sensor data from multiple, different monitored properties (e.g., sensor data from a first security system at a home residence and sensor data from a second security system at a vacation residence).

The system 200 aggregates the monitored sensor data from the multiple, different locations (1520). For example, the system 200 combines the monitored sensor data from the multiple, different locations to enable the combined data to be analyzed for events occurring in each of the different locations. In this example, the combined or aggregated data may reflect activity in each of the different locations and, as such, may provide insights as to the relative usage patterns of the different locations.

The system 200 analyzes the aggregated sensor data (1530) and performs an operation related to controlling one or more energy consuming devices associated with one of the multiple, different locations based on the analysis of the aggregated sensor data (1540). For instance, the system 200 analyzes events detected using the sensor data at the multiple, different locations. The system 200 may analyze patterns of the sensor data at the different locations and take action according to the relative overlap in the patterns of activity at the different locations. For example, the system 200 may determine a first presence pattern that relates to when users are typically present in a first property and a second presence pattern that relates to when users are typically present in a second property. In this example, the system 200 may compare the first and second presence patterns and identify trends that exist within the first and second presence patterns relative to one another.

Based on the comparison, the system 200 may determine when activity at the first property suggests future activity at the second property and vice versa. For instance, the system 200 may detect, that when a user leaves the first property on the weekend, the user travels to the second property. In this instance, the system 200 may perform an operation related to controlling one or more energy consuming devices at the second property in preparation for the user's arrival when the system 200 detects the user leaving the first property on the weekend. Also, the system 200 may detect, that when a user leaves the first property on Thursdays, the user travels to a third property. In response to detecting that the user travels to the third property when the user leaves the first property on Thursdays, the system 200 may perform an operation related to controlling one or more energy consuming devices at the third property in preparation for the user's arrival when the system 200 detects the user leaving the first property on a Thursday.

Figure 16A:
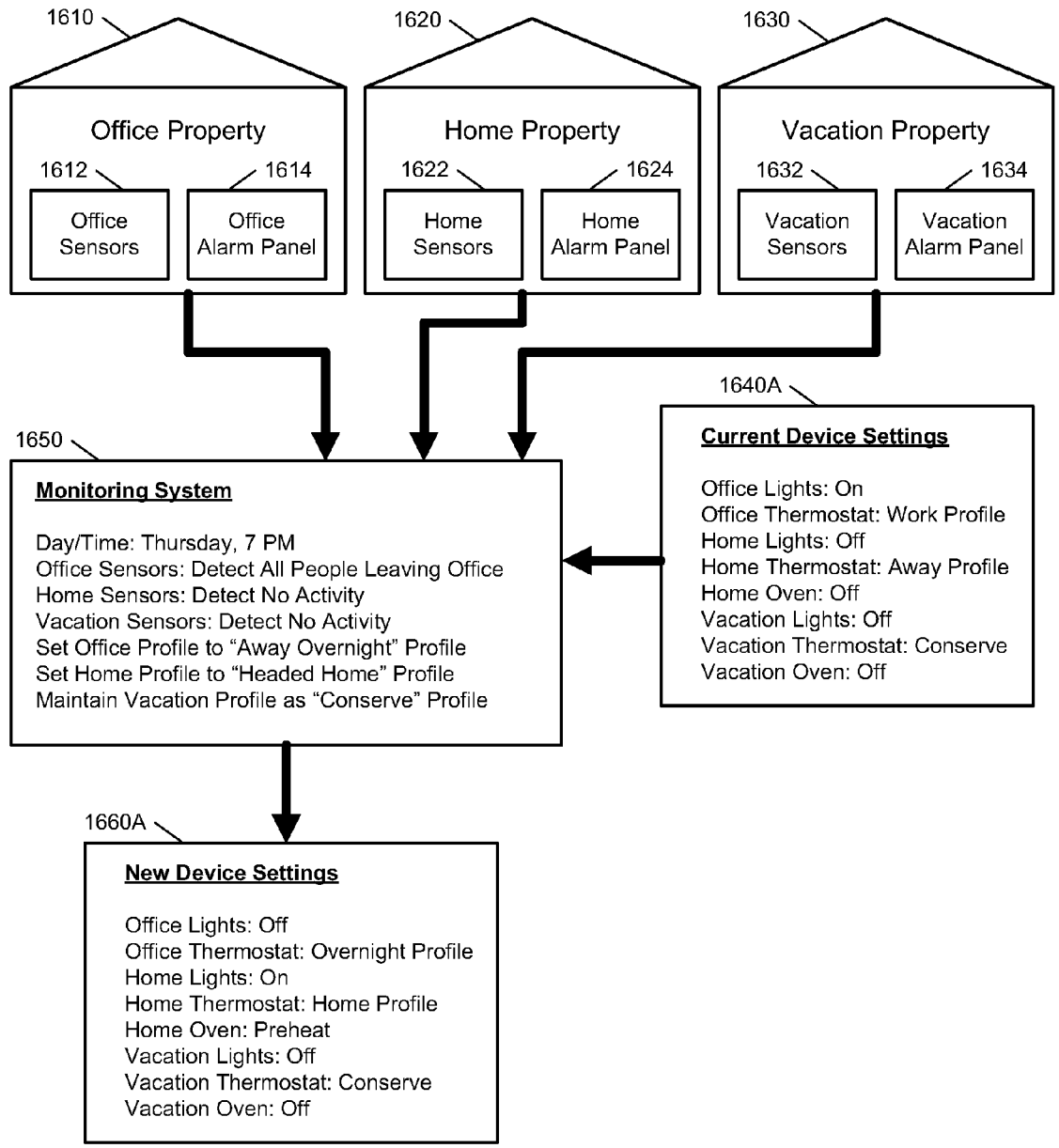
FIGS. 16A, 16B, and 16C illustrate examples of controlling devices based on aggregated sensor data from multiple, different locations.
Figure 16B:
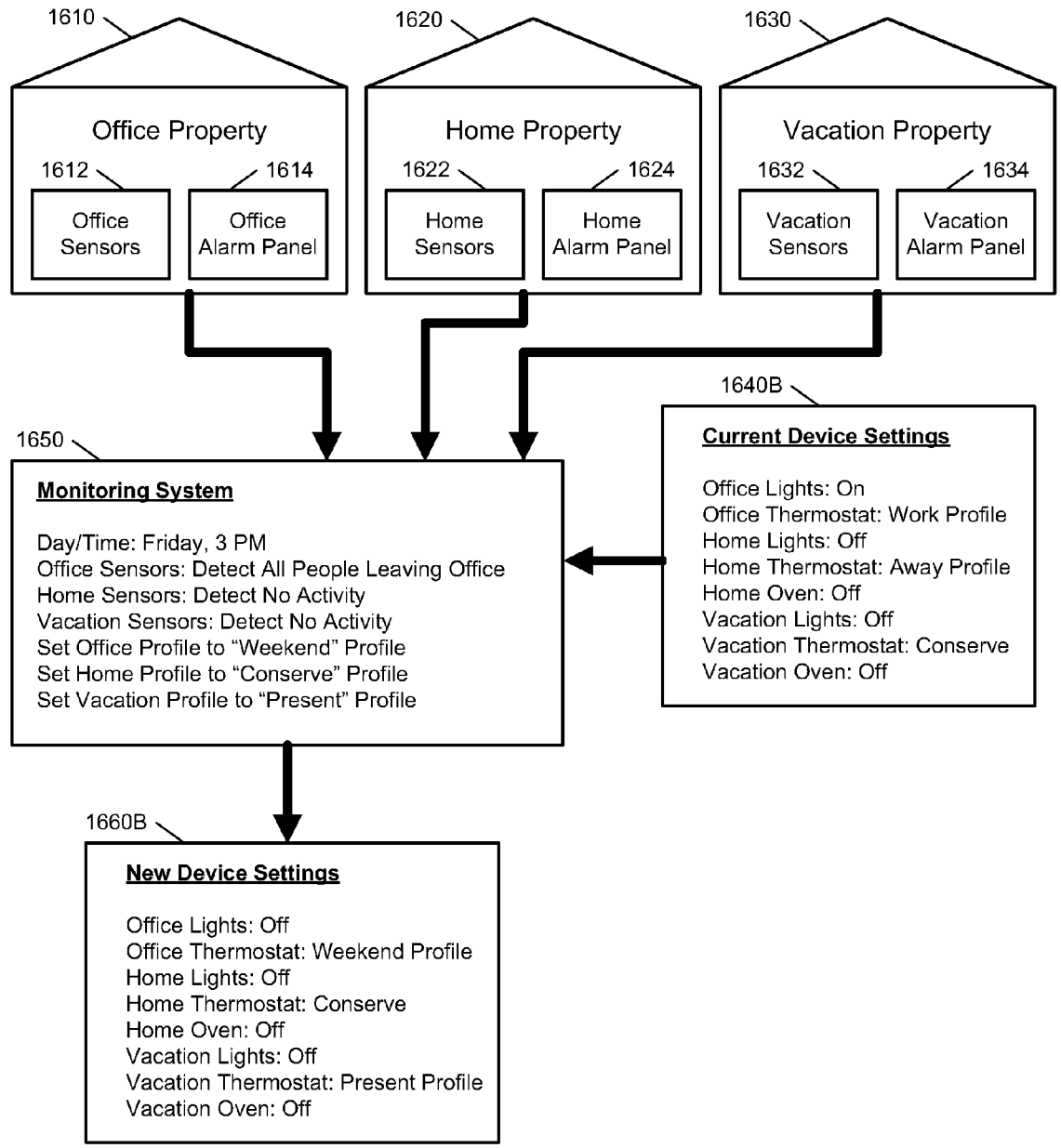
Figure 16C:
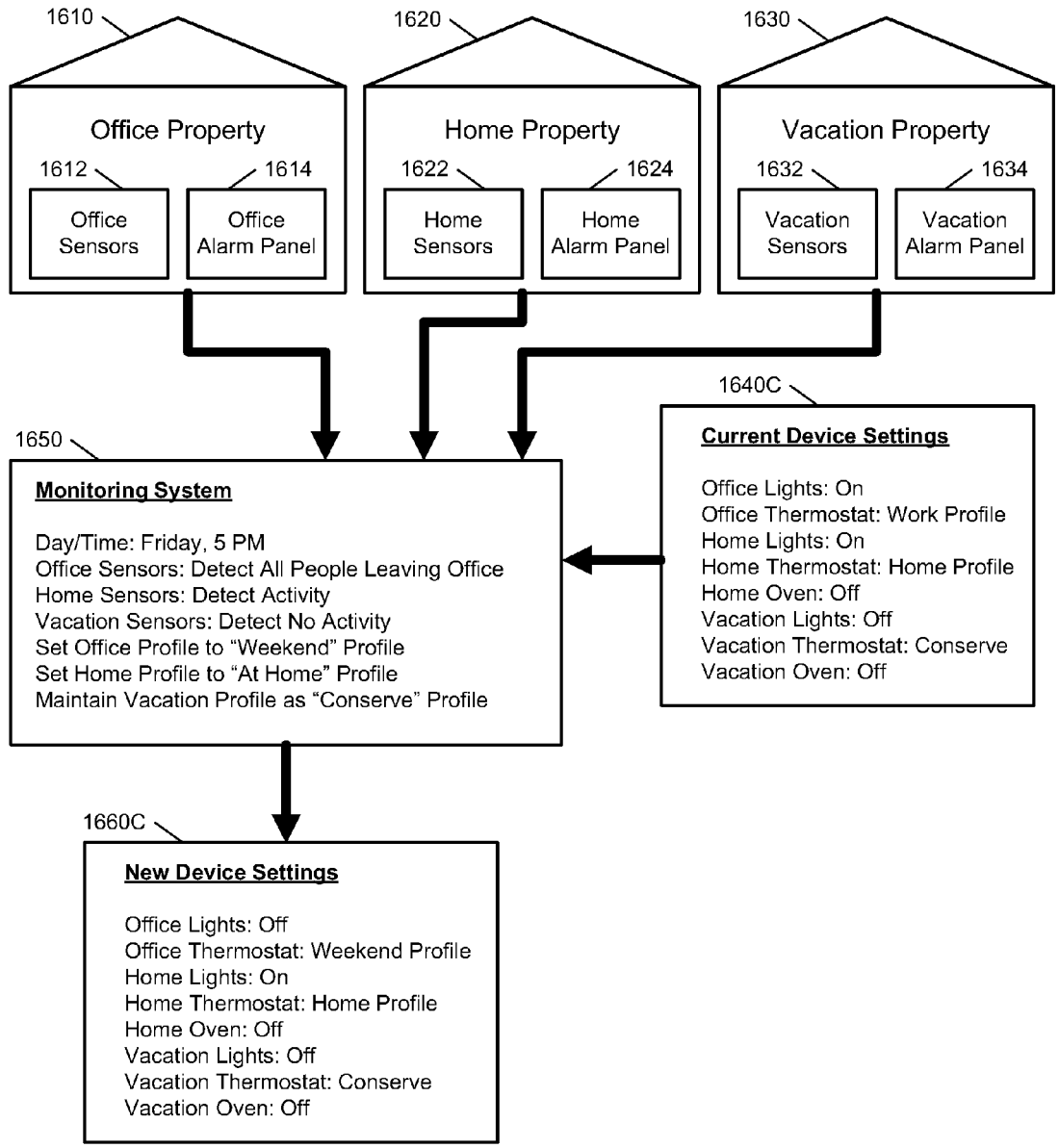

FIGS. 16A, 16B, and 16C illustrate examples of performing an operation related to controlling one or more energy consuming devices associated with a monitored property based on sensor data aggregated for multiple, different properties. As shown in FIG. 16A, a monitoring system 1650 monitors sensed data and controls one or more energy consuming devices at each of an office property 1610, a home property 1620, and a vacation property 1630. The office property 1610 includes sensors 1612 and an alarm panel 1614 for a security system at the office property 1610, the home property 1620 includes sensors 1622 and an alarm panel 1624 for a security system at the home property 1620, and the vacation property 1630 includes sensors 1632 and an alarm panel 1634 for a security system at the vacation property 1630. The monitoring system 1650 may communicate, over a network, with each of the alarm panel 1614, the alarm panel 1624, and the alarm panel 1634 to receive sensor data from sensors included in the corresponding security system. The office property 1610, the home property 1620, and the vacation property 1630 are all associated with (e.g., owned by) a single user.

In the example shown in FIG. 16A, the current device settings 1640A show the status of energy consuming devices at each of the office property 1610, the home property 1620, and the vacation property 1630 on a Thursday at seven in the evening. At this time, the monitoring system 1650 detects that all people are leaving (or have left) the office property 1610, detects no activity at the home property 1620, and detects no activity at the vacation property 1630. From past monitored sensor data for the office property 1610, the home property 1620, and the vacation property 1630, the monitoring system 1650 has derived a relative presence pattern that indicates that, when the all people leave the office property 1610 on a Thursday evening, a user typically returns to the home property 1620 in a relatively short period of time and does not return to the office property 1610 until the following morning. Also, the monitoring system 1650 has derived that the user is not typically present at the vacation property 1630 on Thursday evenings. Based on the derived relative presence pattern and the detection of all people leaving the office property 1610, the monitoring system 1650 determines to prepare the home property 1620 for occupancy in the near future and control devices at the office property 1610 to conserve energy overnight. In this regard, the monitoring system 1650 sets the office profile for the office property 1610 to an "Away Overnight" profile in which energy is conserved for an overnight period and sets the home profile for the home property 1620 to a "Headed Home" profile in which the home property 1620 is prepared for occupancy. The monitoring system 1650 maintains the vacation profile for the vacation property 1630 as a "Conserve" profile in which energy is conserved at all times because the user is unlikely to travel to the vacation property 1630 in the near future. Based on the set profiles, the monitoring system 1650 changes the current device settings 1640A to the new device settings 1660A.

In the example shown in FIG. 16B, the current device settings 1640B show the status of energy consuming devices at each of the office property 1610, the home property 1620, and the vacation property 1630 on a Friday at three in the afternoon. At this time, the monitoring system 1650 detects that all people are leaving (or have left) the office property 1610, detects no activity at the home property 1620, and detects no activity at the vacation property 1630. From past monitored sensor data for the office property 1610, the home property 1620, and the vacation property 1630, the monitoring system 1650 has derived a relative presence pattern that indicates that, when the all people leave the office property 1610 on a Friday afternoon at three and no activity is detected at the home property 1620, a user typically travels to the vacation property 1630 and does not return to the office property 1610 or the home property 1620 until the following Monday. Based on the derived relative presence pattern and the detection of all people leaving the office property 1610, the monitoring system 1650 determines to prepare the vacation property 1630 for occupancy, control devices at the office property 1610 to conserve energy for the weekend, and control devices at the home property 1620 to conserve energy. In this regard, the monitoring system 1650 sets the office profile for the office property 1610 to a "Weekend" profile in which energy is conserved for the weekend, sets the home profile for the home property 1620 to a "Conserve" profile in which the home property 1620 conserves energy, and sets the vacation profile for the vacation property 1630 to a "Present" profile in which the vacation property 1630 is prepared for occupancy. Based on the set profiles, the monitoring system 1650 changes the current device settings 1640B to the new device settings 1660B.

In the example shown in FIG. 16C, the current device settings 1640C show the status of energy consuming devices at each of the office property 1610, the home property 1620, and the vacation property 1630 on a Friday at five in the afternoon. At this time, the monitoring system 1650 detects that all people are leaving (or have left) the office property 1610, detects activity at the home property 1620, and detects no activity at the vacation property 1630. From past monitored sensor data for the office property 1610, the home property 1620, and the vacation property 1630, the monitoring system 1650 has derived a relative presence pattern that indicates that, when the all people leave the office property 1610 on a Friday afternoon at five and activity is detected at the home property 1620, a user typically travels to the home property 1620, does not return to the office property 1610 until the following Monday, and does not travel to the vacation property 1630. Based on the derived relative presence pattern and the detection of all people leaving the office property 1610, the monitoring system 1650 determines to prepare the home property 1620 for occupancy and control devices at the office property 1610 to conserve energy for the weekend. In this regard, the monitoring system 1650 sets the office profile for the office property 1610 to a "Weekend" profile in which energy is conserved for the weekend, sets the home profile for the home property 1620 to an "At Home" profile in which the home property 1620 is controlled in a manner suitable for user presence. The monitoring system 1650 maintains the vacation profile for the vacation property 1630 as a "Conserve" profile in which energy is conserved at all times because the user is unlikely to travel to the vacation property 1630 in the near future. Based on the set profiles, the monitoring system 1650 changes the current device settings 1640C to the new device settings 1660C.

Figure 17:
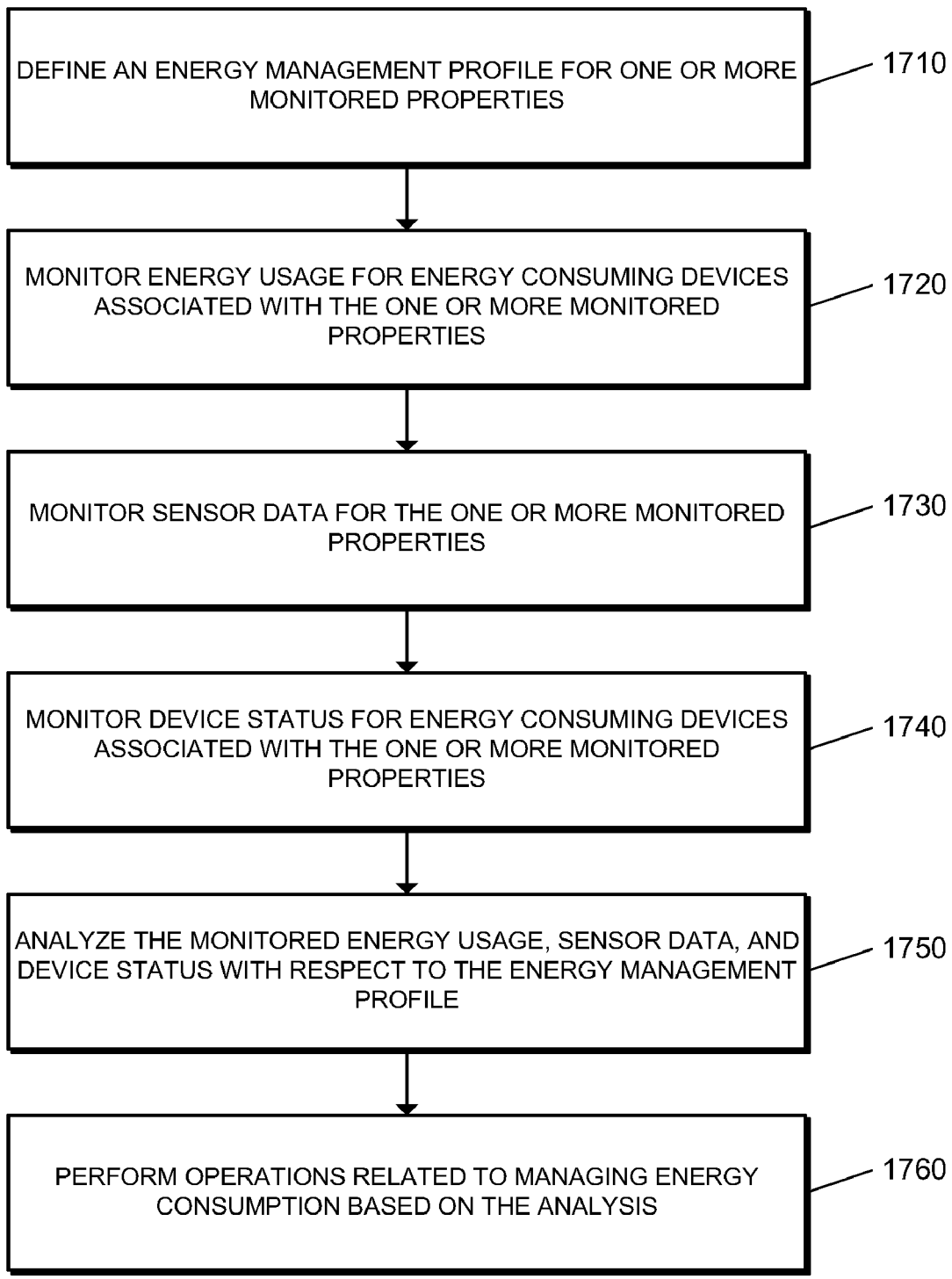

FIG. 17 illustrates an example process 1700 for performing operations related to managing energy consumption based on an energy management profile. The system 200 defines an energy management profile for one or more monitored properties (1710). For example, the system 200 receives user input describing one or more energy management goals or rules that a user would like to set. In this example, the system 200 uses the one or more energy management goals or rules to define a profile for the user, which is used to control energy management at one or more properties associated with the user.

Figure 18:
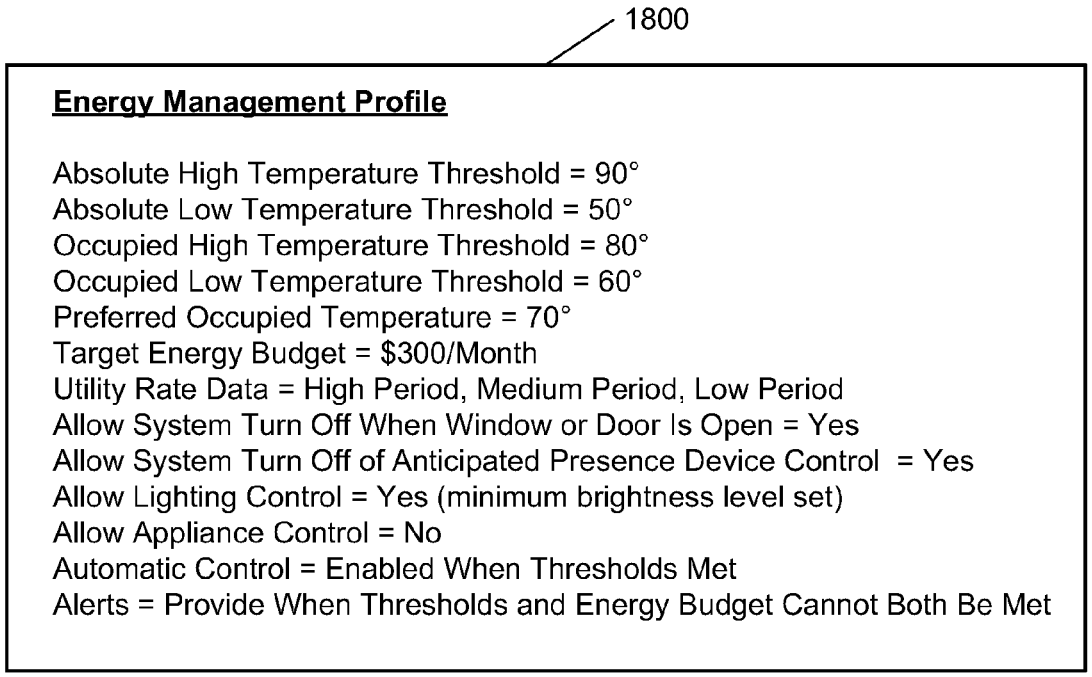
FIG. 18 illustrates an example energy management profile.

The energy management profile may include various temperature thresholds that define when it is and is not appropriate to control a thermostat to perform energy conservation. The energy management profile also may include device control settings that define how the system 200 is allowed to control various devices (e.g., light devices and appliances) within the one or more monitored properties. In addition, the energy management profile may define energy consumption thresholds for the one or more monitored properties in terms of an energy cost budget or energy usage measurements. The energy management profile may define how much control the user would like to give the system 200 in meeting the various thresholds and budgets defined in the energy management profile. An example energy management profile is shown in FIG. 18 and described in more detail below.

The system 200 monitors energy usage for energy consuming devices associated with the one or more monitored properties (1720). The system 200 may measure energy consumed by a single device (e.g., a heating and cooling system controlled by a thermostat) or collectively measure energy consumed by several (e.g., all) energy consuming devices at one or multiple properties (e.g., a collective measure of energy consumed by a heating and cooling system controlled by a thermostat, lighting devices, and appliances at a property). The system 200 may directly measure energy consumed by one or more devices (e.g., using output from an energy meter), the system 200 may estimate an energy measure based on a time of operation and an average energy usage per time, or the system 200 may use a combination of direct energy measuring and estimated energy measuring. The system 200 may determine an energy measure in terms of energy usage units or may determine an energy measure in terms of a cost of energy used based on utility company rates. The system 200 may determine cost of energy using utility company rates received from a utility company or utility company rates derived based on user input (e.g., user input of data included on an energy bill of the user).

The system 200 monitors sensor data for the one or more monitored properties (1730). For instance, the system 200 may use techniques similar to those discussed above with respect to reference numeral 310 to monitor sensor data for the one or more monitored properties.

The system 200 monitors device status for energy consuming devices associated with the one or more monitored properties (1740). For instance, the system 200 may use techniques similar to those discussed above with respect to reference numeral 320 to monitor device status for energy consuming devices associated with the one or more monitored properties.

The system 200 analyzes the monitored energy usage, sensor data, and device status with respect to the energy management profile (1750) and performs operations related to managing energy consumption based on the analysis (1760). For instance, the system 200 analyzes monitored energy usage in relation to events detected using the sensor data and device status information to perform control of the one or more energy consuming devices. The system 200 may analyze single detected events and take action according to single detected events. For instance, when the system 200 determines that the last user has left a property and the monitored energy usage level is at a relatively high level, the system 200 may turn off the lights in the property and set the thermostat to an energy conserve mode.

The system 200 also may analyze patterns of the energy usage, sensor data, and device status and take action according to the relative overlap in the patterns. For example, the system 200 may identify patterns of activity and device status that lead to relatively high or relatively low energy usage. In this example, the system 200 may apply increased efforts to conserve energy when the system 200 detects a pattern of activity and device status that typically leads to relatively high energy usage. Alternatively, when the system 200 detects a pattern of activity and device status that typically leads to relatively low energy usage, the system 200 may perform typical operation and energy conservation operations.

The system 200 may perform several different, types of operations related to controlling the one or more energy consuming devices. For example, the system 200 may automatically, without user intervention, control the one or more energy consuming devices based on the analysis of the monitored energy usage, the monitored sensor data, and the monitored device status. In another example, the system 200 may send alerts or display suggested changes to a user based on the analysis of the monitored energy usage, the monitored sensor data, and the monitored device status. In this example, the system 200 does not control the one or more energy consuming devices until the system 200 receives user input authorizing suggested changes or defining what changes should be made.

FIG. 18 illustrates an example energy management profile 1800 that the system 200 has defined based on user input and the system 200 uses to control energy management at one or more monitored properties. As shown, the energy management profile 1800 defines an absolute high temperature threshold and an absolute low temperature threshold. The system 200 controls the thermostat to maintain a temperature of the property between the absolute high temperature threshold and the absolute low temperature threshold at all times regardless of other energy conservation efforts and regardless of activity in the property.

The energy management profile 1800 also defines an occupied high temperature threshold and an occupied low temperature threshold. The system 200 controls the thermostat to maintain a temperature of the property between the occupied high temperature threshold and the occupied low temperature threshold at all times when the property is detected as being occupied regardless of other energy conservation efforts.

The energy management profile 1800 further defines a preferred occupied temperature. The system 200 controls the thermostat to maintain the preferred occupied temperature when the property is detected as being occupied and when energy conservation thresholds do not indicate that increased energy conservation efforts are needed to meet energy consumption budgets.

In addition, the energy management profile 1800 defines a target energy budget per month. The system 200 monitors energy usage levels within the property throughout the month and tailors energy conservation efforts in an attempt to meet the target energy budget. For example, when the measured energy usage levels suggest that the amount of energy consumed in a month is approaching the target energy budget, the system 200 may automatically invoke increased energy conservation efforts in an attempt to lower energy consumption costs for the remainder of the month. When the measured energy usage levels suggest that the amount of energy consumed in a month is well below the target energy budget, the system 200 may apply typical operation with normal energy conservation efforts.

Further, the energy management profile 1800 defines utility rate data. For instance, the utility rate data may define a high period where rates are relatively high, a medium period where rates are relatively medium, and a low period where rates are relatively low. The system 200 may use the utility rate data to tailor energy usage (or provide alerts to a user to tailor energy usage) toward periods that have lower utility rates.

The energy management profile 1800 defines a number of parameters of how much control the system 200 has over devices in the property. As shown, the energy management profile 1800 includes a parameter that defines whether the user allows the heating or cooling system to be turned off when a window or door is detected as being open. The energy management profile 1800 also includes a parameter that defines whether the user allows the system to turn off anticipated presence device control (e.g., operations, such as thermostat changes, that prepare a property for a user's anticipated arrival). The energy management profile 1800 further includes a parameter that defines whether the user allows the system to control lighting devices and a parameter that defines whether the user allows the system to control appliances. As shown, the energy management profile 1800 may define a minimum brightness setting for lighting devices when the user allows the system to control lighting devices.

In addition, the energy management profile 1800 includes parameters that define whether the user allows the system to perform automatic control over devices or prefers alerts to be sent when potential energy management operations are detected. In this example, the user has given the system automatic control as long as thresholds are met and has asked that alerts be provided when the set thresholds and the energy budget cannot both be met. The alerts may allow the user to redefine or have the system temporarily ignore the thresholds to meet the energy budget based on the user's decision.

Figure 19:
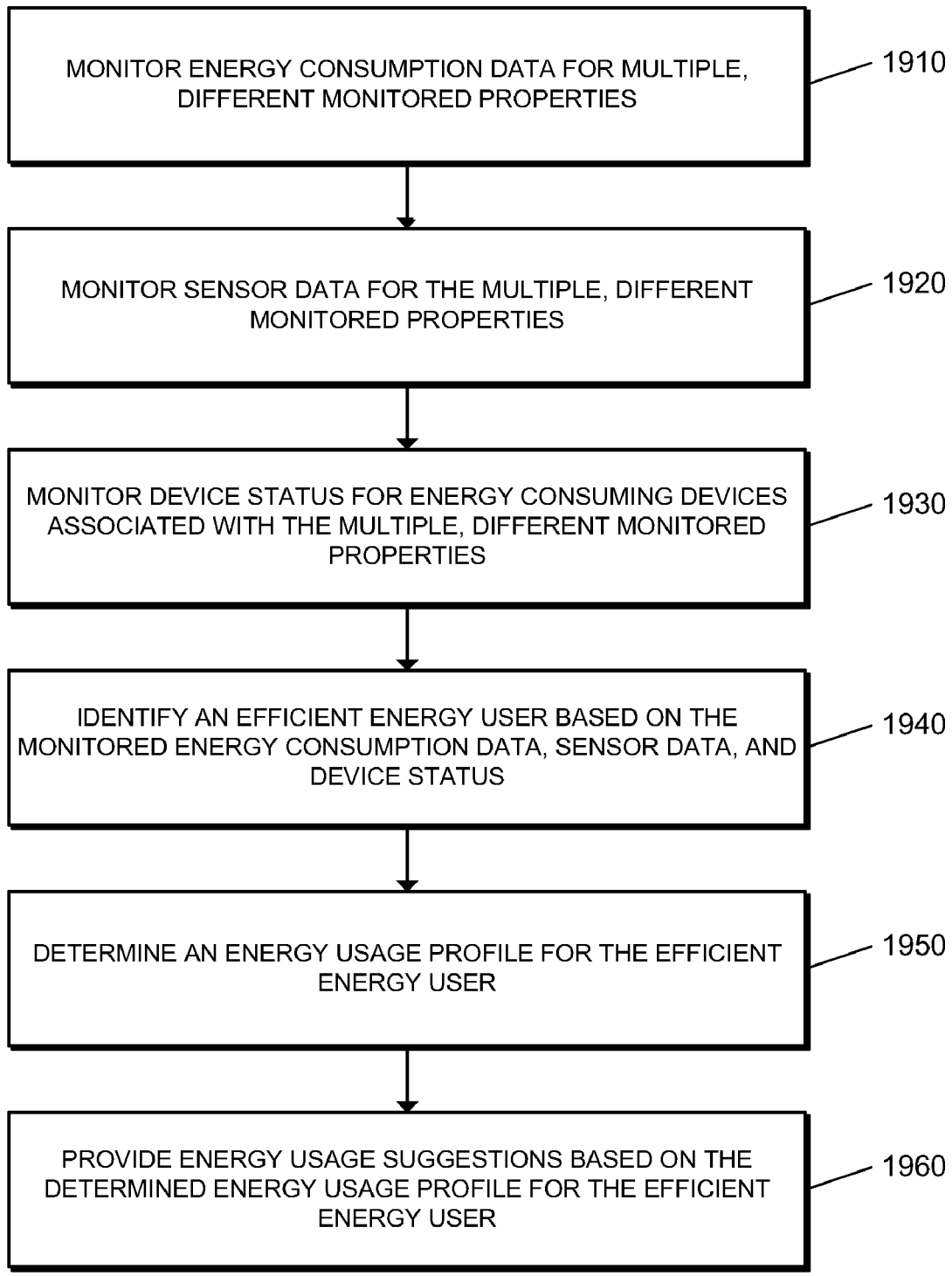

FIG. 19 illustrates an example process 1900 for performing operations related to managing energy consumption based on an energy management profile. The system 200 monitors energy consumption data for multiple, different monitored properties (1910). For instance, the system 200 may use techniques similar to those discussed above with respect to reference numeral 1710 to monitor energy consumption data. The system 200 monitors energy consumption data for multiple, different monitored properties that are remote and separate from each other.

The multiple, different monitored properties may be selected based on various criteria. For example, the system 200 may select properties in a particular geographic area (e.g., all properties within a particular community). The system 200 also may select properties having a similar property type (e.g., all single family homes) or properties located in a similar climate (e.g., properties that are located far away from each other, but share a similar weather pattern). The system 200 further may select properties of users that are connected within a social network. The system 200 may use any combination of these criteria to select which properties to monitor.

The system 200 monitors sensor data for the multiple, different monitored properties (1920). For instance, the system 200 may use techniques similar to those discussed above with respect to reference numeral 310 to monitor sensor data. The system 200 monitors sensor data for the same multiple, different monitored properties selected as described above with respect to reference numeral 1910.

The system 200 monitors device status for energy consuming devices associated with the multiple, different monitored properties (1930). For instance, the system 200 may use techniques similar to those discussed above with respect to reference numeral 320 to monitor device status. The system 200 monitors device status for the same multiple, different monitored properties selected as described above with respect to reference numeral 1910.

The system 200 identifies an efficient energy user based on the monitored energy consumption data, sensor data, and device status (1940). For example, the system 200 may identify, from among the monitored properties, a property that has relatively low energy usage levels. In this example, the system 200 may consider properties with similar property types and identify the properties that have relatively low energy consumption. The system 200 may identify the property having the lowest energy consumption or identify properties in a low energy consumption group (e.g., the bottom ten percent in terms of energy consumption).

In some implementations, the system 200 analyzes energy consumption at the monitored properties relative to activity patterns and device usage patterns at the monitored properties. In these implementations, the system 200 looks not only at the total energy consumption at a property, but also energy consumption relative to the amount of time the property is occupied and the amount of time energy consuming devices are being operated within the property. As such, the system 200 is able to identify users that use energy efficiently when the users are present within the property. In this regard, the system 200 is able to detect instances in which a user has a relatively low energy consumption total at a property, but is infrequently at the property and is not efficiently using energy when the user is at the property. In addition, the system 200 is able to detect instances in which a user has a relatively high energy consumption total at a property, but is frequently at the property and is efficiently using energy when the user is at the property.

In some examples, the system 200 identifies an energy usage level of a monitored property based on the monitored energy consumption data and identifies an activity level of the monitored property based on the monitored sensor data and the monitored device status. The activity level of the monitored property represents how frequently the monitored property is determined to be occupied based on the monitored sensor data and how frequently energy consuming devices are detected as being in use in the monitored property based on the monitored device status. In these examples, the system 200 determines a ratio of the identified energy usage level of the monitored property and the identified activity level of the monitored property and identifies a user of the monitored property as an efficient energy user based on the determined ratio.

The system 200 determines an energy usage profile for the efficient energy user (1950). For instance, the system 200 identifies an activity pattern within the property of the efficient energy user and a device status pattern within the property of the efficient energy user. The energy usage profile may describe the energy management settings the efficient energy user uses in efficiently consuming energy.

The system 200 provides energy usage suggestions based on the determined energy usage profile for the efficient energy user (1960). For example, the system 200 may present the determined energy usage profile for the efficient energy user to other users to inform the other users of types of energy management activities the other users can undertake to become efficient energy users. The system 200 may limit presentation of the energy usage profile to users identified as being inefficient energy users. In addition, the system 200 may limit presentation of the energy usage profile to users that have a similar property type as the efficient energy user and/or that have a similar activity pattern as the efficient energy user. The system 200 also may present comparison data to show an inefficient energy user how much energy savings the inefficient energy user can achieve by adopting the energy usage profile of the efficient energy user as compared to the current energy usage of the inefficient energy user.

Figure 20:
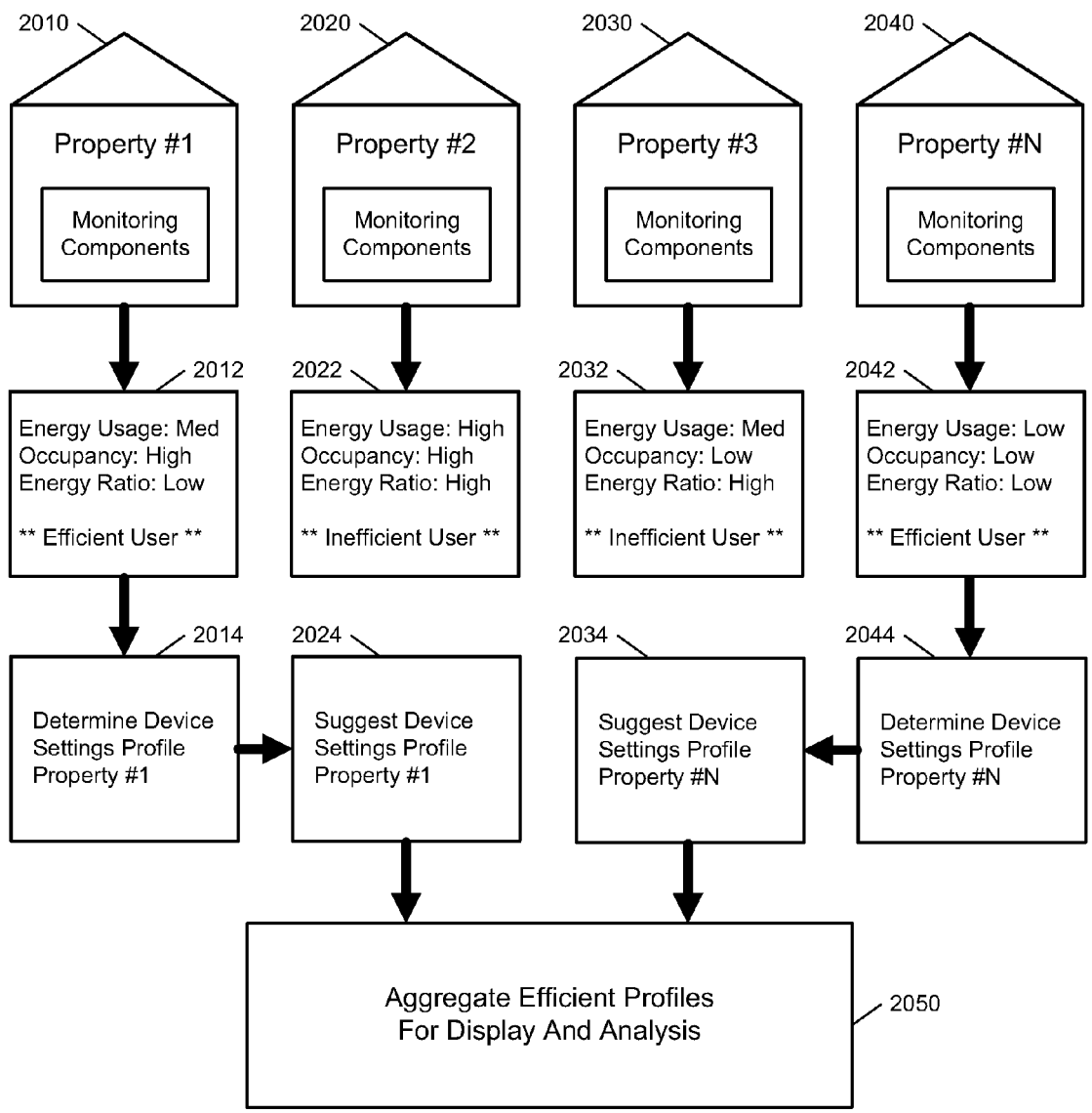
FIG. 20 illustrates an example of providing energy usage suggestions based on determined energy usage profiles for efficient energy users.

FIG. 20 illustrates an example of providing energy usage suggestions based on determined energy usage profiles for efficient energy users. As shown, a first property 2010, a second property 2020, a third property 2030, and an nth property 2040 are monitored for energy consumption levels and activity patterns, such as presence patterns within the properties. The monitored properties may all belong to users within a community that are connected through a social network and have a similar property type. Although the example shown in FIG. 20 includes four monitored properties, actual implementations may include more (or fewer) monitored properties.

In the example of FIG. 20, an energy profile is determined for each monitored property by a monitoring system. The first property 2010 has a first energy profile 2012 that indicates that a user of the first property 2010 consumes a relatively medium amount of energy, occupies the first property 2010 at a relatively high rate, and has a relatively low ratio of energy usage as compared to presence within the first property 2010. The second property 2020 has a second energy profile 2022 that indicates that a user of the second property 2020 consumes a relatively high amount of energy, occupies the second property 2020 at a relatively high rate, and has a relatively high ratio of energy usage as compared to presence within the second property 2020. The third property 2030 has a third energy profile 2032 that indicates that a user of the third property 2030 consumes a relatively medium amount of energy, occupies the third property 2030 at a relatively low rate, and has a relatively high ratio of energy usage as compared to presence within the third property 2030. The nth property 2040 has an nth energy profile 2042 that indicates that a user of the nth property 2040 consumes a relatively low amount of energy, occupies the nth property 2040 at a relatively low rate, and has a relatively low ratio of energy usage as compared to presence within the nth property 2040.

Based on the energy profiles, the monitoring system identifies users of the first property 2010 and the nth property 2040 as efficient energy users and identifies users of the second property 2020 and the third property 2030 as inefficient energy users. In response to the identification of the user of the first property 2010 as an efficient energy user, the monitoring system determines a device setting profile 2014 for the first property 2010. In response to the identification of the user of the nth property 2040 as an efficient energy user, the monitoring system determines a device setting profile 2044 for the nth property 2040.

In addition, the monitoring system identifies the user of the second property 2020 as an inefficient energy user that has a similar presence pattern as the user of the first property 2010. The monitoring system also identifies the user of the third property 2030 as an inefficient energy user that has a similar presence pattern as the user of the nth property 2040. In response to the identification of the user of the second property 2020 as an inefficient energy user that has a similar presence pattern as the user of the first property 2010, the monitoring system provides a suggestion 2024 to the user of the second property 2020 that suggests the efficient energy usage profile determined for the user of the first property 2010. In response to the identification of the user of the third property 2030 as an inefficient energy user that has a similar presence pattern as the user of the nth property 2040, the monitoring system provides a suggestion 2034 to the user of the third property 2030 that suggests the efficient energy usage profile determined for the user of the nth property 2040.

The monitoring system also aggregates in storage 2050 efficient profiles for display and analysis. The monitoring system may analyze a large number of efficient profiles to identify preferred energy management techniques and derive an efficient energy management profile that accounts for the large number of efficient profiles. The monitoring system may use the derived efficient energy management profile to perform automatic energy management control for users of the monitoring system and also may present the derived efficient energy management profile as a suggested profile that users may choose to adopt. The monitoring system further may determine and aggregate profiles for inefficient energy users to identify energy practices to avoid. The energy practices to avoid may be used to perform automatic energy management control for users of the monitoring system and also may be presented to users as practices to avoid.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made. For example, in some implementations, the system 200 (e.g., one or more components of the system 200) may implement a savings calculator. In these implementations, the system 200 catalogs every single action it takes. The cataloged actions include any operation the system 200 performs automatically (e.g., without human intervention), or anything inferred to be a user response to a system alert. For instance, if the system 200 alerts the user that the user's property (e.g., house) is being excessively cooled while unoccupied, and the system 200 detects that the user subsequently, within a configurable amount of time, takes action to reduce the cooling schedule of the property, then the system 200 considers the user response to the alert as a "system action," which is cataloged. The system 200 maintains a database of all actions and also rate information, size of home, and home efficiency rating (which may be derived using techniques described below), as well as government (e.g., Department of Energy) guidelines, to estimate savings associated with each action. The system 200 may estimate savings for each action taken and may aggregate the estimated savings to generate an overall savings estimate for a period of time. The system 200 may display the savings estimate(s) to a user or may perform control operations based on the savings estimate(s).

In some examples, the system 200 derives a Home R Value Rating for a monitored property. In these examples, the system 200 determines an inside temperature of a monitored property and outside weather information using techniques described throughout this disclosure. Based on the determined inside temperature of the monitored property and the outside weather information, the system 200 derives the property's overall R rating. For example, the system 200 may detect that nobody is at the monitored property and that it is eight-eight degrees outside, and determine that this is a good time to test a cooling system (e.g., HVAC) to derive an R value for the monitored property. In response, the system 200 launches a test, which cools the property to seventy degrees and then shuts off the cooling system (e.g., HVAC) and all lights or other heat emitting devices (within reason) within the property. The system 200 next watches how quickly the internal temperature of the property rises. From the internal temperature rising data, the system 200 calculates the R value for the property. The system 200 then uses the calculated R value to more efficiently control the thermostat to minimize usage and maximize efficiency on behalf of the consumer.

In some implementations, the system 200 judges the efficiency of a heating and cooling system (e.g., an HVAC system) at a property on a relative basis. In these implementations, the system 200 determines the property's R value (e.g., using the derivation techniques described above or having the user input the property's R value), and observes the work of the heating and cooling system (e.g., the HVAC system) to raise/lower temperatures. Based on analysis of the property's R value and the observations related to the work of the heating and cooling system (e.g., the HVAC system) to raise/lower temperatures, the system 200 determines one or more ways to improve either the R value of the property or the heating and cooling system (e.g., the HVAC system), and alerts the user accordingly. Based on the knowledge of the R value of the property, the weather patterns for the location of the property, the occupancy patterns for the property, and the desires of the property dwellers, the system 200 computes what the potential savings would be from different types of heating or cooling systems (e.g., geothermal, oil, gas, swamp cooler, electric, etc.) and informs the property dwellers of the same. The system 200 may provide personalized automated consulting advice on these critical system decisions and offer advertisements to the property dwellers based on the decisions the system 200 makes.

In some examples, the system 200 is a learning system. In these examples, the system 200 runs experiments occasionally on cooling or heating a property, or heating water at the property. For instance, given a certain expected outdoor weather condition (e.g., weather, humidity, solar intensity), the system 200 may advise the property owner to close all window drapes one day before going to work and calculate a baseline for that day. The system 200 then, during periods of that day, experiments with different cooling intensity control process (e.g., gradual cooling versus intensive cooling) and measures the work required to create a certain amount of temperature change. Based on the results of the experiments, the system 200 learns how gradually or intensively to proceed with cooling the property to best achieve efficient operation. The system 200 may use this learned information to control future heating or cooling scenarios in a more efficient manner.

The system 200 may use a similar type of analysis to learn efficiency information related to a water heater at the property. Given a certain existing temperature and a certain temperature of inflowing water, the system 200 experiments with heating element intensity of the water heater and learns which is the best rate at which to prepare water temperature for an expected human presence.

The system 200 may constantly use its archive of information to learn over time, and the system 200 may dynamically and without user driven inputs, run tests (usually with no occupants) to maximize its understanding of the property. The system 200 may occasionally prompt the user on a periodic basis (e.g., Quarterly) to ask "Have you changed anything in your home such as new windows, drapes, floor covering, insulation, roofing, external painting, etc.?" If the user answers "Yes," then system 200 recalibrates and uses the additional user-inputted data as another variable in the learning process.

Other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A method for performing an operation related to controlling one or more energy consuming devices, the method comprising:
    monitoring sensor data captured by one or more sensors that sense attributes relevant to user presence at one or more monitored properties;
    monitoring status of one or more energy consuming devices associated with the one or more monitored properties;
    monitoring geographic location data of one or more users associated with the one or more monitored properties;
    inferring future occupancy status of the one or more users in the one or more monitored properties based on the monitored geographic location data and the monitored sensor data;
    determining an operation related to controlling the one or more energy consuming devices in the one or more monitored properties based on the inferred future occupancy status of the one or more users in the one or more monitored properties and the monitored status of the one or more energy consuming devices; and performing, using at least one processor, the determined operation related to controlling the one or more energy consuming devices.

2. The method of claim 1:

wherein inferring future occupancy status of the one or more users in the one or more monitored properties based on the monitored geographic location data comprises:

determining a distance of a user from a property based on the monitored geographic location data, comparing the distance of the user from the property to a threshold distance from the property, determining whether the user is within the threshold distance from the property based on the comparison, inferring that the user will occupy the property within a particular period of time based on a determination that the user is within the threshold distance from the property, and inferring that the user will not occupy the property within the particular period of time based on a determination that the user is outside of the threshold distance from the property; and wherein performing the determined operation related to controlling the one or more energy consuming devices comprises:

performing an operation related to preparing the property for occupation by the particular period of time based on an inference that the user will occupy the property within the particular period of time, and performing an operation related to conserving energy during the particular period of time based on an inference that the user will not occupy the property within the particular period of time.

3. The method of claim 1:

wherein inferring future occupancy status of the one or more users in the one or more monitored properties based on the monitored geographic location data comprises:

determining a direction in which the user is traveling based on the monitored geographic location data, determining whether the user is traveling toward the property or away from the property based on the determined direction in which the user is traveling, inferring that the user will occupy the property within a particular period of time based on a determination that the user is traveling toward the property, and inferring that the user will not occupy the property within the particular period of time based on a determination that the user is traveling away from the property; and wherein performing the determined operation related to controlling the one or more energy consuming devices comprises:

performing an operation related to preparing the property for occupation by the particular period of time based on an inference that the user will occupy the property within the particular period of time, and performing an operation related to conserving energy during the particular period of time based on an inference that the user will not occupy the property within the particular period of time.

4. A method for performing an operation related to controlling one or more energy consuming devices, the method comprising:

monitoring sensor data captured by one or more sensors that sense attributes relevant to user presence at one or more monitored properties;

monitoring status of one or more energy consuming devices associated with the one or more monitored properties;

analyzing the monitored sensor data and the monitored device status with respect to a set of one or more rules; and performing, using at least one processor, an operation related to controlling the one or more energy consuming devices based on the analysis of the monitored sensor data and the monitored device status with respect to the set of one or more rules, wherein monitoring sensor data captured by one or more sensors that sense attributes relevant to user presence at one or more monitored properties comprises:

monitoring sensor data captured by sensors that sense attributes relevant to user presence at multiple, different locations, and aggregating the monitored sensor data from the multiple, different locations;

wherein analyzing the monitored sensor data and the monitored device status with respect to the set of one or more rules comprises analyzing the aggregated sensor data from the multiple, different locations with respect to the set of one or more rules; and wherein performing the operation related to controlling the one or more energy consuming devices comprises performing an operation related to controlling the one or more energy consuming devices associated with one of the multiple, different locations based on the analysis of the aggregated sensor data, wherein monitoring sensor data captured by sensors that sense attributes relevant to user presence at multiple, different locations comprises:

monitoring first sensor data captured by first local sensors that sense attributes relevant to user presence at a first property;

monitoring second sensor data captured by second local sensors that sense attributes relevant to user presence at a second property, the second property being separate and remote from the first property; and wherein performing the operation related to controlling the one or more energy consuming devices associated with one of the multiple, different locations based on the analysis of the aggregated sensor data comprises performing an operation related to controlling one or more energy consuming devices associated with the second property based on the first sensor data captured by the first local sensors that sense attributes relevant to user presence at the first property.

5. A method for performing an operation related to controlling one or more energy consuming devices, the method comprising:

monitoring energy consumption data for multiple, different monitored properties;

monitoring sensor data for the multiple, different monitored properties monitoring device status for energy consuming devices associated with the multiple, different monitored properties;

identifying an efficient energy user based on the monitored energy consumption data, the monitored sensor data, and the monitored device status;

determining, using at least one processor, an energy usage profile for the efficient energy user based on the monitored energy consumption data, the monitored sensor data, and the monitored device status; and providing an energy usage suggestion to another user that is different than the efficient energy user based on the determined energy usage profile for the efficient energy user, wherein identifying an efficient energy user based on the monitored energy consumption data, the monitored sensor data, and the monitored device status comprises:

identifying an energy usage level of a monitored property based on the monitored energy consumption data;

identifying an activity level of the monitored property based on the monitored sensor data and the monitored device status, the activity level of the monitored property representing how frequently the monitored property is determined to be occupied based on the monitored sensor data and how frequently energy consuming devices are detected as being in use in the monitored property based on the monitored device status;

determining a ratio of the identified energy usage level of the monitored property and the identified activity level of the monitored property; and identifying a user of the monitored property as the efficient energy user based on the determined ratio; and wherein providing the energy usage suggestion to another user that is different than the efficient energy user comprises:

identifying another monitored property that has an activity level that is similar to the identified activity level of the monitored property and that has an energy usage level that is higher than the identified energy usage level of the monitored property; and providing the energy usage suggestion to a user of the other monitored property.

6. A monitoring system comprising:

at least one processor; and at least one computer-readable storage medium coupled to the at least one processor having stored thereon instructions which, when executed by the at least one processor, causes the at least one processor to perform operations comprising:

monitoring energy consumption data for multiple, different monitored properties;

monitoring sensor data for the multiple, different monitored properties monitoring device status for energy consuming devices associated with the multiple, different monitored properties;

identifying an efficient energy user based on the monitored energy consumption data, the monitored sensor data, and the monitored device status;

determining an energy usage profile for the efficient energy user based on the monitored energy consumption data, the monitored sensor data, and the monitored device status; and providing an energy usage suggestion to another user that is different than the efficient energy user based on the determined energy usage profile for the efficient energy user, wherein identifying an efficient energy user based on the monitored energy consumption data, the monitored sensor data, and the monitored device status comprises:

identifying an energy usage level of a monitored property based on the monitored energy consumption data;

identifying an activity level of the monitored property based on the monitored sensor data and the monitored device status, the activity level of the monitored property representing how frequently the monitored property is determined to be occupied based on the monitored sensor data and how frequently energy consuming devices are detected as being in use in the monitored property based on the monitored device status;

determining a ratio of the identified energy usage level of the monitored property and the identified activity level of the monitored property; and identifying a user of the monitored property as the efficient energy user based on the determined ratio; and wherein providing the energy usage suggestion to another user that is different than the efficient energy user comprises:

identifying another monitored property that has an activity level that is similar to the identified activity level of the monitored property and that has an energy usage level that is higher than the identified energy usage level of the monitored property; and providing the energy usage suggestion to a user of the other monitored property.

7. A monitoring system comprising:

at least one processor; and at least one computer-readable storage medium coupled to the at least one processor having stored thereon instructions which, when executed by the at least one processor, causes the at least one processor to perform operations comprising:

monitoring sensor data captured by one or more sensors that sense attributes relevant to user presence at one or more monitored properties;

monitoring status of one or more energy consuming devices associated with the one or more monitored properties;

analyzing the monitored sensor data and the monitored device status with respect to a set of one or more rules; and performing an operation related to controlling the one or more energy consuming devices based on the analysis of the monitored sensor data and the monitored device status with respect to the set of one or more rules, wherein monitoring sensor data captured by one or more sensors that sense attributes relevant to user presence at one or more monitored properties comprises:

monitoring sensor data captured by sensors that sense attributes relevant to user presence at multiple, different locations, and aggregating the monitored sensor data from the multiple, different locations;

wherein analyzing the monitored sensor data and the monitored device status with respect to the set of one or more rules comprises analyzing the aggregated sensor data from the multiple, different locations with respect to the set of one or more rules; and wherein performing the operation related to controlling the one or more energy consuming devices comprises performing an operation related to controlling the one or more energy consuming devices associated with one of the multiple, different locations based on the analysis of the aggregated sensor data, wherein monitoring sensor data captured by sensors that sense attributes relevant to user presence at multiple, different locations comprises:
  monitoring first sensor data captured by first local sensors that sense attributes relevant to user presence at a first property;
  monitoring second sensor data captured by second local sensors that sense attributes relevant to user presence at a second property, the second property being separate and remote from the first property; and
wherein performing the operation related to controlling the one or more energy consuming devices associated with one of the multiple, different locations based on the analysis of the aggregated sensor data comprises performing an operation related to controlling one or more energy consuming devices associated with the second property based on the first sensor data captured by the first local sensors that sense attributes relevant to user presence at the first property.

8. A monitoring system comprising:
at least one processor; and
at least one computer-readable storage medium coupled to the at least one processor having stored thereon instructions which, when executed by the at least one processor, causes the at least one processor to perform operations comprising:
  monitoring sensor data captured by one or more sensors that sense attributes relevant to user presence at one or more monitored properties;
  monitoring status of one or more energy consuming devices associated with the one or more monitored properties;
  monitoring geographic location data of one or more users associated with the one or more monitored properties;
  inferring future occupancy status of the one or more users in the one or more monitored properties based on the monitored geographic location data and the monitored sensor data;
  determining an operation related to controlling the one or more energy consuming devices in the one or more monitored properties based on the inferred future occupancy status of the one or more users in the one or more monitored properties and the monitored status of the one or more energy consuming devices; and
  performing the determined operation related to controlling the one or more energy consuming devices.

9. The monitoring system of claim 8:
wherein inferring future occupancy status of the one or more users in the one or more monitored properties based on the monitored geographic location data comprises:
  determining a distance of a user from a property based on the monitored geographic location data,
  comparing the distance of the user from the property to a threshold distance from the property,
  determining whether the user is within the threshold distance from the property based on the comparison,
  inferring that the user will occupy the property within a particular period of time based on a determination that the user is within the threshold distance from the property, and
  inferring that the user will not occupy the property within the particular period of time based on a determination that the user is outside of the threshold distance from the property; and
wherein performing the determined operation related to controlling the one or more energy consuming devices comprises:
  performing an operation related to preparing the property for occupation by the particular period of time based on an inference that the user will occupy the property within the particular period of time, and
  performing an operation related to conserving energy during the particular period of time based on an inference that the user will not occupy the property within the particular period of time.

10. The monitoring system of claim 8:
wherein inferring future occupancy status of the one or more users in the one or more monitored properties based on the monitored geographic location data comprises:
  determining a direction in which the user is traveling based on the monitored geographic location data,
  determining whether the user is traveling toward the property or away from the property based on the determined direction in which the user is traveling,
  inferring that the user will occupy the property within a particular period of time based on a determination that the user is traveling toward the property, and
  inferring that the user will not occupy the property within the particular period of time based on a determination that the user is traveling away from the property; and
wherein performing the determined operation related to controlling the one or more energy consuming devices comprises:
  performing an operation related to preparing the property for occupation by the particular period of time based on an inference that the user will occupy the property within the particular period of time, and
  performing an operation related to conserving energy during the particular period of time based on an inference that the user will not occupy the property within the particular period of time.

11. The monitoring system of claim 8:
wherein determining the operation related to controlling the one or more energy consuming devices in the one or more monitored properties based on the inferred future occupancy status of the one or more users in the one or more monitored properties and the monitored status of the one or more energy consuming devices comprises determining to automatically control the one or more energy consuming devices in the one or more monitored properties; and
wherein performing the determined operation related to controlling the one or more energy consuming devices comprises automatically, without user intervention, controlling the one or more energy consuming devices in the one or more monitored properties.

12. The monitoring system of claim 8:
wherein determining the operation related to controlling the one or more energy consuming devices in the one or more monitored properties based on the inferred future occupancy status of the one or more users in the one or more monitored properties and the monitored status of the one or more energy consuming devices comprises determining to suggest one or more changes for the one or more energy consuming devices in the one or more monitored properties; and
wherein performing the determined operation related to controlling the one or more energy consuming devices comprises suggesting the one or more changes for the one or more energy consuming devices in the one or more monitored properties.

13. The monitoring system of claim 8:
wherein determining the operation related to controlling the one or more energy consuming devices in the one or more monitored properties based on the inferred future occupancy status of the one or more users in the one or more monitored properties and the monitored status of the one or more energy consuming devices comprises determining an operation related to controlling one or more lighting devices located in the one or more monitored properties; and
wherein performing the determined operation related to controlling the one or more energy consuming devices comprises performing the determined operation related to controlling the one or more lighting devices located in the one or more monitored properties.

14. The monitoring system of claim 8:
wherein determining the operation related to controlling the one or more energy consuming devices in the one or more monitored properties based on the inferred future occupancy status of the one or more users in the one or more monitored properties and the monitored status of the one or more energy consuming devices comprises determining an operation related to controlling one or more thermostats located in the one or more monitored properties; and
wherein performing the determined operation related to controlling the one or more energy consuming devices comprises performing the determined operation related to controlling the one or more thermostats located in the one or more monitored properties.

15. The monitoring system of claim 8:
wherein monitoring geographic location data of one or more users associated with the one or more monitored properties comprises detecting travel patterns of the one or more users associated with the one or more monitored properties; and
wherein inferring future occupancy status of the one or more users in the one or more monitored properties based on the monitored geographic location data and the monitored sensor data comprises inferring future occupancy status of the one or more users in the one or more monitored properties based on the detected travel patterns.

16. The method of claim 1:
wherein determining the operation related to controlling the one or more energy consuming devices in the one or more monitored properties based on the inferred future occupancy status of the one or more users in the one or more monitored properties and the monitored status of the one or more energy consuming devices comprises determining to automatically control the one or more energy consuming devices in the one or more monitored properties; and
wherein performing the determined operation related to controlling the one or more energy consuming devices comprises automatically, without user intervention, controlling the one or more energy consuming devices in the one or more monitored properties.

17. The method of claim 1:
wherein determining the operation related to controlling the one or more energy consuming devices in the one or more monitored properties based on the inferred future occupancy status of the one or more users in the one or more monitored properties and the monitored status of the one or more energy consuming devices comprises determining to suggest one or more changes for the one or more energy consuming devices in the one or more monitored properties; and
wherein performing the determined operation related to controlling the one or more energy consuming devices comprises suggesting the one or more changes for the one or more energy consuming devices in the one or more monitored properties.

18. The method of claim 1:
wherein determining the operation related to controlling the one or more energy consuming devices in the one or more monitored properties based on the inferred future occupancy status of the one or more users in the one or more monitored properties and the monitored status of the one or more energy consuming devices comprises determining an operation related to controlling one or more lighting devices located in the one or more monitored properties; and
wherein performing the determined operation related to controlling the one or more energy consuming devices comprises performing the determined operation related to controlling the one or more lighting devices located in the one or more monitored properties.

19. The method of claim 1:
wherein determining the operation related to controlling the one or more energy consuming devices in the one or more monitored properties based on the inferred future occupancy status of the one or more users in the one or more monitored properties and the monitored status of the one or more energy consuming devices comprises determining an operation related to controlling one or more thermostats located in the one or more monitored properties; and
wherein performing the determined operation related to controlling the one or more energy consuming devices comprises performing the determined operation related to controlling the one or more thermostats located in the one or more monitored properties.

20. The method of claim 1:
wherein monitoring geographic location data of one or more users associated with the one or more monitored properties comprises detecting travel patterns of the one or more users associated with the one or more monitored properties; and
wherein inferring future occupancy status of the one or more users in the one or more monitored properties based on the monitored geographic location data and the monitored sensor data comprises inferring future occupancy status of the one or more users in the one or more monitored properties based on the detected travel patterns.

* * * * *